US012749010B2

(12) United States Patent
Furlan et al.

(10) Patent No.: US 12,749,010 B2
(45) Date of Patent: Sep. 29, 2026

(54) MACHINE LEARNING MODEL FOR PREDICTING DRIVER-VEHICLE COMPATIBILITY

(71) Applicant: Capital One Services, LLC, McLean, VA (US)

(72) Inventors: Elizabeth Furlan, Plano, TX (US); Chih-Hsiang Chow, Coppell, TX (US); Steven Dang, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 1130 days.

(21) Appl. No.: 17/646,903

(22) Filed: Jan. 4, 2022

(65) Prior Publication Data

US 2023/0214712 A1 Jul. 6, 2023

(51) Int. Cl.
*G06N 20/00* (2019.01)
*G06N 5/02* (2023.01)

(52) U.S. Cl.
CPC ............... *G06N 20/00* (2019.01); *G06N 5/02* (2013.01)

(58) Field of Classification Search
CPC ................................ G06N 20/00; G06N 5/02
See application file for complete search history.

(56) References Cited

U.S. PATENT DOCUMENTS 11,010,827 B1 * 5/2021 Latronico .............. G06Q 40/03
2011/0270486 A1 * 11/2011 Stevens .................. G07C 5/008 701/31.4
2015/0254719 A1 * 9/2015 Barfield, Jr. ....... G06Q 30/0261 701/31.5
2017/0337573 A1 * 11/2017 Toprak ................... G06Q 10/20
2017/0369069 A1 * 12/2017 Yen ........................ B60W 40/09
2019/0012603 A1 * 1/2019 Miller ....................... G06N 5/04
2020/0098032 A1 3/2020 August et al.
2021/0166103 A1 * 6/2021 Jackson ................. G06N 3/042
2021/0179125 A1 * 6/2021 Vardharajan .......... B60W 40/09
2023/0194291 A1 * 6/2023 Dagley .............. G01C 21/3492 701/533

OTHER PUBLICATIONS

Cars.com Launches First AI Matchmaking Experience in Automotive and New Ad Campaign to Help Consumers Fall in Love With Finding Their Perfect Car; Aug. 6, 2018; 6 pages; Cars.com; https://www.cars.com/articles/carscom-launches-first-ai-matchmaking-experience-in-automotive-and--new-ad-campaign-to-help-consumers-fall-in-love-with-finding-their-perfect-car-1420700992851/.

* cited by examiner

*Primary Examiner* — KC Chen
(74) *Attorney, Agent, or Firm* — Harrity & Harrity, LLP

(57) ABSTRACT

In some implementations, a system may receive driving data indicating, for each of a plurality of drivers, driving behavior measured during vehicle operation and importance values corresponding to driving categories associated with the driving behavior. The system may determine driver clusters. The system may receive vehicle data indicating, for each of a plurality of vehicles, performance values corresponding to the driving categories. The system may generate a data structure indicating a degree of association between a vehicle and each driver cluster based on the driving behavior, importance values, and performance values. The system may receive, for a user, driver preference data including data measured during vehicle operation and an importance value for each driving category. The system may determine a driver cluster to which the user belongs based on the driver preference data. The system may determine compatible vehicles based on the driver cluster and the data structure.

20 Claims, 11 Drawing Sheets

MACHINE LEARNING MODEL FOR PREDICTING DRIVER-VEHICLE COMPATIBILITY

BACKGROUND

A vehicle experience may provide an individual, such as a driver, access to a vehicle for a period of time to permit the individual to review the vehicle. For example, prior to leasing or purchasing a vehicle, an individual may have access to the vehicle, via a test drive, to review the vehicle and/or confirm whether the vehicle satisfies the individual's expectations.

SUMMARY

Some implementations described herein relate to a system for predicting driver-vehicle compatibility using machine learning. The system may include one or more memories and one or more processors communicatively coupled to the one or more memories. The one or more processors may be configured to receive driving data for a plurality of drivers, wherein the driving data indicates, for each of the plurality of drivers, driving behavior measured during vehicle operation and a plurality of importance values corresponding to a plurality of driving categories associated with the driving behavior. The one or more processors may be configured to determine, using an unsupervised machine learning model and based on the driving behavior and the plurality of importance values, a plurality of driver clusters for categorizing the plurality of drivers. The one or more processors may be configured to receive vehicle data for a plurality of vehicles, wherein the vehicle data indicates, for each of the plurality of vehicles, a plurality of performance values corresponding to the plurality of driving categories. The one or more processors may be configured to generate a data structure that indicates a degree of association between a vehicle, or a vehicle cluster that includes the vehicle, and each driver cluster of the plurality of driver clusters based on the driving behavior, the plurality of importance values, and the plurality of performance values. The one or more processors may be configured to receive driver preference data for a user, wherein the driver preference data includes data measured during vehicle operation and an importance value for each driving category of the plurality of driving categories. The one or more processors may be configured to determine a driver cluster, of the plurality of driver clusters, to which the user belongs based on the driver preference data. The one or more processors may be configured to determine one or more compatible vehicles for the user based on the driver cluster and the data structure. The one or more processors may be configured to output vehicle information that indicates the one or more compatible vehicles.

Some implementations described herein relate to a method of predicting driver-vehicle compatibility. The method may include receiving, by a system, driver preference data for a driver, wherein the driver preference data indicates an importance value for each of a plurality of driving categories. The method may include associating, by the system, the driver with a driver archetype, where data corresponding to the driver archetype indicates a combination of ranges of values for the plurality of driving categories, and where an individual importance value for a driving category, of the plurality of driving categories, for the driver falls within a corresponding range of values for the driving category in connection with the driver archetype. The method may include storing, by the system, the driver preference data and an indication of the driver archetype in a driver profile database, wherein the driver preference data and the indication of the driver archetype are associated with a driver identifier associated with the driver. The method may include receiving, by the system, data indicating a vehicle, wherein performance data of the vehicle is stored in a vehicle profile database and indicates a plurality of performance values corresponding to the plurality of driving categories. The method may include determining, by the system, a compatibility score indicating a compatibility between the driver and the vehicle, wherein the compatibility score is based on a comparison of the performance data of the vehicle with the data corresponding to the driver archetype. The method may include transmitting, by the system, data indicating the compatibility score.

Some implementations described herein relate to a non-transitory computer-readable medium that stores a set of instructions for a device. The set of instructions, when executed by one or more processors of the device, may cause the device to obtain data corresponding to a plurality of driver archetypes, wherein the data corresponding to each of the plurality of driver archetypes indicates a combination of ranges of values for a plurality of driving categories. The set of instructions, when executed by one or more processors of the device, may cause the device to receive vehicle data for a plurality of vehicles, wherein the vehicle data indicates, for each of the plurality of vehicles, a plurality of performance values corresponding to the plurality of driving categories. The set of instructions, when executed by one or more processors of the device, may cause the device to generate a data structure that indicates a corresponding degree of association between each vehicle, of the plurality of vehicles, and each driver archetype, of the plurality of driver archetypes, based on the plurality of performance values and the combination of ranges of values for the plurality of driving categories. The set of instructions, when executed by one or more processors of the device, may cause the device to receive driver preference data for a user, wherein the driver preference data indicates a plurality of importance values corresponding to the plurality of driving categories. The set of instructions, when executed by one or more processors of the device, may cause the device to assign a driver archetype to the user based on the driver preference data. The set of instructions, when executed by one or more processors of the device, may cause the device to determine a suggested vehicle, of the plurality of vehicles, based on the data structure, wherein the suggested vehicle has a degree of association that satisfies a threshold value in connection with the driver archetype. The set of instructions, when executed by one or more processors of the device, may cause the device to transmit, to a user device, data indicating the suggested vehicle.

DETAILED DESCRIPTION

Figure 1A:
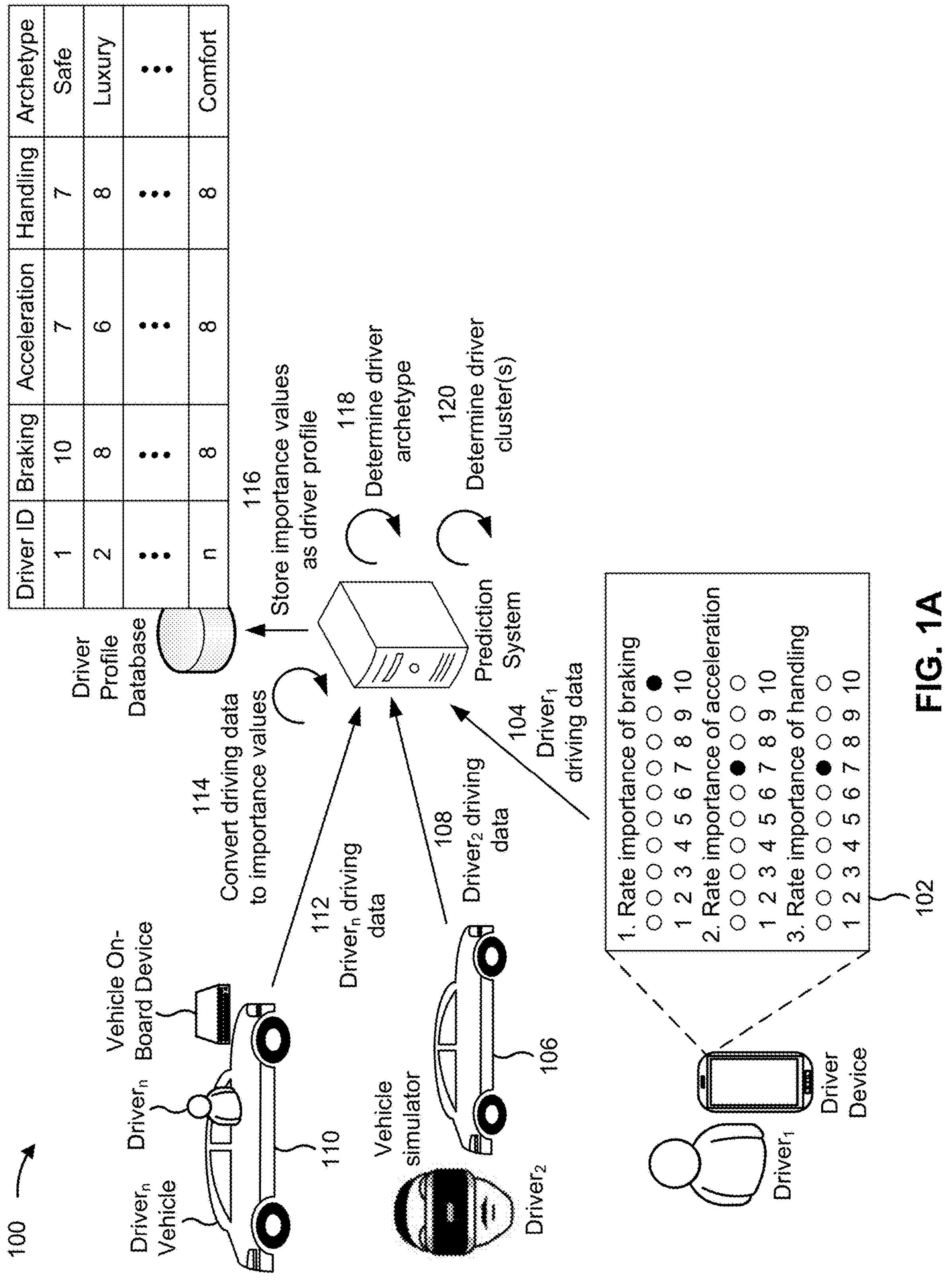
FIGS. 1A-1D are diagrams of an example implementation relating to predicting driver-vehicle compatibility.

The following detailed description of example implementations refers to the accompanying drawings. The same reference numbers in different drawings may identify the same or similar elements.

A test drive typically involves an individual requesting a seller (e.g., an individual or organization, such as a manufacturer, dealer, or other entity that sells vehicles) to allow the individual to drive a vehicle for a period of time and accessing the vehicle from a location of the seller. For example, a consumer may arrive at a dealership and request the dealership to authorize the test drive. However, in some situations, the consumer may be unable to travel to the dealership to participate in the test drive, and therefore, may not be able to experience the vehicle firsthand. The consumer may be able to look at reviews of the vehicle to gain a foundational idea of whether or not the vehicle meets the consumer's preferences. However, the reviews alone may not be able to provide an accurate gauge on how compatible the vehicle may be for the consumer.

Some implementations described herein provide a system that predicts a compatibility between a consumer (e.g., a driver) and one or more vehicles in lieu of the consumer having to actually participate in a test drive. The system may also be used for a consumer interested in renting a vehicle and desiring to know if the vehicle will be compatible for the consumer's intended driving use of the vehicle. The system bases the predictions on a relationship between driving data related to the driving behavior of drivers in various driving categories and performance data related to the performance of vehicles in the driving categories. The system may collect the driving data and the performance data from different sources (e.g., direct input from the user and/or monitoring and measuring actual driver performance). From the collected data, the system may generate driver profiles, which may be associated with one or more driver archetypes representative of the driver's driving behavior, and vehicle profiles. The system may generate and/or determine a data structure that indicates a relationship between the vehicles and different driver profiles and/or driver archetypes.

A consumer interested in finding vehicles with which the consumer is compatible may provide, to the system, information related to the consumer's preferences. The system may use the consumer's preferences to determine a particular driver profile or driver archetype under which the consumer may fall. From the determined driver profile or driver archetype, the system may be able to identify one or more compatible vehicles based on the data structure of the relationship between vehicles and the driver profiles and/or driver archetypes.

In some implementations described herein, the system may determine a compatibility score between a consumer (e.g., a driver) and a particular vehicle in which the consumer is interested. The consumer may provide, to the system, vehicle information (e.g., make and model), along with the consumer's driver identifier. From the driver identifier, the system may identify the consumer's driver profile and/or driver archetype and the driving data associated therewith. Additionally, from the vehicle information, the system may obtain vehicle performance data, which the system may compare with the driving data. Based on this comparison (e.g., how similar the driving data and the vehicle performance data are), the system may determine a compatibility score representative of the compatibility between the consumer and the particular vehicle.

By using data related to drivers' driving behavior and associating that data with actual performance data of vehicles, the system may improve accuracy in predicting compatibility between a consumer and vehicles (e.g., compared to systems only considering consumer preferences and vehicle statistics). Additionally, incorporating real data across many drivers further improves the accuracy and lessens variability of the prediction of compatibility between the consumer and the vehicles.

FIGS. 1A-1D are diagrams of an example 100 associated with predicting driver-vehicle compatibility. As shown in FIGS. 1A-1D, example 100 includes a prediction system, a driver profile database, a vehicle profile database, a driver device or user device, a vehicle on-board device, a vehicle simulator, a vehicle review system, a third party entity database, and a third party device. These devices are described in more detail in connection with FIGS. 4 and 5.

As shown in FIG. 1A, a prediction system may collect driving data for drivers (e.g., users) in a variety of ways. The driving data may be representative of and/or indicate the driving behavior of the drivers. In some implementations, the prediction system may receive driving data via active input from a driver (e.g., via a mobile application installed on and executed from a driver device or via a web-based application accessed by the driver device over a network). For example, as shown by reference number 102, the driver device may display a series of queries for the driver (e.g., Driven) to respond and provide a rating of importance for different driving categories. The driving categories may relate to vehicle performance (e.g., braking, acceleration, handling, etc.), vehicle comfort (e.g., the height of the vehicle and/or the driver seat from the ground, the amount of interior space, etc.), and/or vehicle convenience features (e.g., location of dashboard information, location of shifter, type of shifter, etc.).

As further shown by reference number 102, the responses to the queries may be in the form of numeric values (e.g., a value between 1 and 10). The driver (e.g., the user) may input the numeric value by pressing a designated button or area on the driver device corresponding to the particular value. Alternatively, the user may manually input the numeric value into dedicated entry fields presented on a display of the driver device (e.g., via a physical keyboard, a virtual keyboard, or a voice entry).

Additionally, or alternatively, the response to the queries may be a selection of one option out of multiple options. For example, for a query relating to a height of the vehicle and/or the driver seat from the ground, the options from which the driver may select the response may be "High," "Medium," or "Low." The options may be displayed on the device, and the driver may select the option by pressing a designated button or area on the driver device corresponding to the particular option.

As shown by reference number 104, the prediction system may receive the driving data from the driver device (e.g., over a network, as described in more detail below). For example, the driver may interact with the driver device to submit responses to the queries, which may cause the driver device to transmit the driving data to the prediction system.

In some implementations, the prediction system may receive the driving data via passive input from the driver. For example, as shown by reference number 106, a driver (e.g., $Driver_2$) may participate in a vehicle simulator that simulates operation of a vehicle, where the driving data may be obtained from the driver's simulated operation of the vehicle. The vehicle simulator may incorporate a steering wheel, a gas pedal, and a brake pedal for the driver to use during a simulation. Additionally, the vehicle simulator may incorporate a virtual reality (VR) headset so that the driver may have a more realistic driving experience. Alternatively, the vehicle simulator may incorporate a screen that displays the simulated driving view (e.g., first person view). Additionally, the vehicle simulator may incorporate any other mechanisms (e.g., hydraulic systems) to simulate driving conditions, such as tilting and/or shaking of the vehicle.

During a driving simulation, the vehicle simulator may present a simulated driving environment for the driver. For example, the simulated driving environment may include a roadway with other vehicles on the roadway and various traffic signals (e.g., traffic lights, stop signs, merges, etc.) along the route. The simulation may provide a specific route for the driver so as to lead the driver through various simulated conditions (e.g., local driving, with multiple turns and stops, highway driving at higher speeds, varying degrees of traffic, and different weather conditions). The vehicle simulator may include various sensors, such as in connection with the steering wheel, the gas pedal, and the brake pedal. For example, a sensor in connection with the steering wheel may measure the angular velocity at which the driver rotates the steering wheel. As another example, sensors in connection with the gas pedal and brake pedal may measure displacement of the pedals and/or force applied to the pedals. From such measurements, the vehicle simulator (e.g., one or more processors of the vehicle simulator) may determine simulated driving metrics, such as vehicle speed, acceleration, deceleration, centripetal force, centrifugal force, or the like. The simulated driving metrics may be representative of the driver's driving behavior in different driving categories.

As shown by reference number 108, the prediction system may receive, from the vehicle simulator, data corresponding to the simulated driving metrics. For example, the vehicle simulator may transmit the data after the driving simulation is complete and/or based on driver input (e.g., the driver selects an option to submit the data or a subset of the data to the prediction system). Alternatively, the vehicle simulator may transmit the data in real-time as the driving simulation is in progress (e.g., transmit blocks of data in intervals of 10 seconds).

As another example of passive input of driving data from the driver, as shown by reference number 110, the driver's actual driving performance and behavior may be monitored, for example, by an on-board device of a vehicle of a driver (e.g., $\text{Driver}_n$). The on-board device may include or communicate with a navigation system that may track and/or measure actual driving metrics of the vehicle (e.g., via one or more sensors and/or devices). Similar to the vehicle simulator, the actual driving metrics may include, but are not limited to, vehicle speed, acceleration, deceleration, centripetal force, centrifugal force, or the like. Additionally, or alternatively, the actual driving metrics may be measured and/or determined via the driver device (e.g., mobile phone) of the driver while operating the vehicle. The actual driving metrics may be representative of the driver's driving behavior in the different driving categories. Utilizing data from actual driving behavior provides more accuracy than either simulated driving behavior or driver input on driving behavior because the data represents the way the driver actually would use any of the vehicles for which the system is determining compatibility.

As shown by reference number 112, the prediction system may receive, from the vehicle on-board device (and/or from the driver device), data corresponding to the actual driving metrics. For example, the vehicle on-board device may transmit the data after a particular route is completed (e.g., after the driver has turned the ignition off or the vehicle has been at a standstill for a set duration) and/or based on driver input (e.g., the driver selects an option presented on a display of the vehicle on-board device to submit the data or a subset of the data to the prediction system). Alternatively, the vehicle on-board device may transmit the data in real-time as the route is in progress (e.g., transmit blocks of data in intervals of 10 seconds). Additionally, or alternatively, the driver device may similarly transmit data after the route is completed, based on driver input, or in real-time when the route is in progress.

As explained above, the driving data received from the various sources may be in different forms (e.g., numeric ratings, numeric measurements, or text inputs). As such, as shown by reference number 114, the prediction system may convert the different forms of driving data into a common value system (e.g., into importance values representative of the importance of each driving category to the driving behavior of the driver) so that the driving data collected from the different sources may be more easily compared and associated with one another.

For example, when the driver directly provides input of importance values for different driving categories (e.g., 10, 7, and 7 for braking, acceleration, and handling, respectively, as shown in FIG. 1A), the prediction system may maintain those values as the importance values in the driver profile (e.g., no conversion is needed). When the driver selects a particular option from multiple options, the prediction system may assign a numeric importance value for each of the options, and the numeric importance value of the selected option may be included in the driver profile. For example, for a driving category of vehicle/driver seat height from the ground, the options for "High," "Medium," and "Low" may be assigned numeric values of 10, 5, and 1, respectively. As such, if the driver selected "Medium," then the driver profile would have an importance value of 5 for the driving category.

When the driving data is in the form of metrics (e.g., simulated or actual), the prediction system may apply one or more rules to convert the metrics into importance values. For example, the prediction system may assign an importance value for a specific range of values of the metric, as defined in the rules. As an example, if the metrics indicate an average acceleration that is above 10 $m/s^2$, then the prediction system may apply an importance value of 10, and if the average acceleration is below 1 $m/s^2$, then the prediction system may apply an importance value of 1.

Additionally, or alternatively, after the importance values have been obtained, the prediction system may apply a tolerance to each importance value so that the driver profile has a range of importance values for each driving category. In some implementations, the tolerance may be a set value (e.g., 1) for all the driving categories. For example, an importance value of 7 would have a range of importance values from 6-8. Alternatively, for driving categories having greater importance to the driver (e.g., having a higher importance value), the tolerance value may be greater than for driving categories of less importance (e.g., having a lower tolerance value). For example, an importance value of 8 may have a tolerance value of 2, for a range of 6-10, whereas an importance value of 5 may have a tolerance value of 1, for a range of 4-6.

As shown by reference number 116, the prediction system may store the driving data (e.g., importance values or ranges of importance values) for each driver in a driver profile database as a driver profile under the driver's account. The driver's account may be associated with a driver identifier that uniquely identifies the driver.

Although FIG. 1A shows the prediction system receiving driving data for different drivers from the different data sources, the prediction system may receive driving data for the same driver from more than one of the data sources. In such a scenario, the importance values for each driving category may be an average of the importance values obtained from the different data sources. For example, if the importance values from the driving data received from the driver input (e.g., via the driver device) are 10, 7, and 7 (e.g., for the driving categories related to braking, acceleration, and handling), and the importance values obtained from actual driving metrics (e.g., via the on-board device or the driver device) are 8, 7, and 8, then the importance values for the driver profile stored in the driver profile database may be 9, 7, and 7.5. Additionally, or alternatively, the importance values obtained from the data sources may be weighted differently depending upon the accuracy of the data source in representing the driving behavior of the driver. For example, the actual driving metrics may be the most accurate, the simulated driving metrics the second most accurate, and the driver input via the driver device the least accurate. As such, the importance values obtained from the actual driving metrics may have the greatest weight, and the driver input may have the least weight. For example, with reference to the example above, the importance values for the driver profile stored in the driver profile database may be 8.5, 7, and 7.8.

Additionally, or alternatively, the prediction system may use the simulated driving metrics and/or the actual driving metrics (e.g., without being converted to importance values) to adjust importance values for one or more of the driving categories input by the driver (e.g., the user) when creating a driver profile for the driver. For example, if the driver inputs a high importance value (e.g., 10) for acceleration, but the actual driving metrics indicate an average acceleration of only a moderate importance (e.g., 5 $m/s^2$), the prediction system may adjust the importance value associated with the driver profile by a set amount. The adjustment amount may be based on one or more rules.

As an example, if the driving metrics (e.g., simulated and/or actual) fall within a specific range indicating a specific level of importance (e.g., less than 3 $m/s^2$ indicating a low importance level, between 3 $m/s^2$ and 7 $m/s^2$ indicating a medium importance level, and/or greater than 7 $m/s^2$ indicating a high level importance), then the prediction system may adjust the user-provided importance value by a set amount corresponding to the importance level. For example, for a low importance level, the prediction system may decrease the importance value for the particular category (e.g., acceleration) by 1 for a medium range of user-provided values (e.g., 4-7) or by 2 for a high range of user-provided values (e.g., 8-10). For a medium importance level, the prediction system may increase the importance value for the particular category by 1 for a low range of user-provided values (e.g., 1-3) or decrease the importance value by 1 for a high range of user-provided values (e.g., 8-10). For a high importance level, the prediction system may increase the importance value for the particular category by 1 for a medium range of user-provided values (e.g., 4-7) or by 2 for a low range of user-provided values (e.g., 1-3).

The adjustment to the importance values in one or more driving categories may affect the compatible vehicles with the user and/or the user's compatibility with a particular vehicle (e.g., a compatibility score with the vehicle, as described in more detail below in connection with FIGS. 2A and 2B) determined by the prediction system. As such, users with similar user-provided importance values may have different compatible vehicles and/or different compatibility with the same vehicle.

As shown by reference number 118, the prediction system may determine a driver archetype for each driver profile. The prediction system may determine the driver archetype based on different rules or conditions for the different types of driver archetypes. For example, each driver archetype may be based on a range of importance values for each driving category. If the driver profile has importance values that fall within the ranges of a particular driver archetype for a minimum number of the driving categories (e.g., all of the driving categories, 8 out of 10 driving categories, etc.), then the prediction system may apply that driver archetype to that driver profile.

As an example, a driver archetype of a "Safe" driver may have importance value ranges of 8-10 for braking, 6-8 for acceleration, and 7-9 for handling. A driver profile having importance values of 10, 7, and 7 for those respective categories would have a "Safe" driver archetype. When the driver profile has ranges of importance values for the different driving categories (as opposed to single values), the driver profile may be assigned a driver archetype where the ranges in the driving profile overlap the ranges of the driver archetype by a threshold amount (e.g., 100%, 75%, etc.). For example, a driver profile having ranges of 8-10 for braking, 5-7 for acceleration, and 8-10 for handling may be assigned the "Safe" driver archetype.

Other examples of driver archetypes may include "Luxury," "Comfort," "Sporty," "City," "Highway," "Long Distance," "Commuter," etc. Each driver archetype may have multiple combinations of ranges corresponding to the multiple driving categories to be able to cover all different possible combinations of importance values (or ranges of importance values) in the driver profiles (e.g., so that each driver profile may be assigned a driver archetype). The driver archetype may be stored with the driver profile in the driver profile database and associated with the driver identifier.

As shown by reference number 120, the prediction system may determine one or more driver clusters in which drivers have common driver profiles. In some implementations, the prediction system may use a machine learning model (e.g., an unsupervised machine learning model) to determine the driver cluster(s), as described in more detail below in connection with FIG. 3. Additionally, or alternatively, the prediction system may determine the driver cluster(s) based on one or more rules. For example, the prediction system may determine a driver cluster of all drivers having the same driver archetype.

As another example, the prediction system may determine a driver cluster of drivers having importance values within a threshold range of each other for a minimum number of driving categories. Additionally, driver clusters may be refined based on the simulated driving metrics and/or the actual driving metrics. For example, if multiple drivers belong to a driver cluster based on similar provided importance values (e.g., importance values falling within a range of 8-10 for acceleration), the prediction system may break the driver cluster into sub-driving clusters in which the simulated driving metrics and/or the actual driving metrics indicate different levels of importance (e.g., low importance level, medium importance level, or high importance level).

As another example, the prediction system may determine a driver cluster of drivers requiring adaptive driving equipment (e.g., hand controls, swivel seating, wheelchair securement, etc.). The driver cluster may be for drivers requiring any adaptive driving equipment. Alternatively, there may be multiple driver clusters each for drivers requiring the same, specific type of adaptive driving equipment.

As another example, the prediction system may determine a driver cluster based on demographic information (e.g., sex and/or age group) and/or geographic location (e.g., zip code or drivers within a threshold distance of a common location) of the drivers. For example, all male drivers with an age between 25 and 40 and located in the same zip code may be in the same driver cluster.

Although the importance values are described with respect to FIG. 1A and elsewhere herein on a scale of 1-10, the prediction system may use any scale for the importance values, for example, a larger scale (e.g., 1-50, 1-100, etc.). Using a larger scale, the prediction system may be able to divide the importance values into more refined ranges upon which the rules for assigning driver archetypes and/or driver clusters are based. As such, the prediction system may be able to create more driver clusters and/or more accurately group drivers with similar driving behavior together.

Figure 1B:
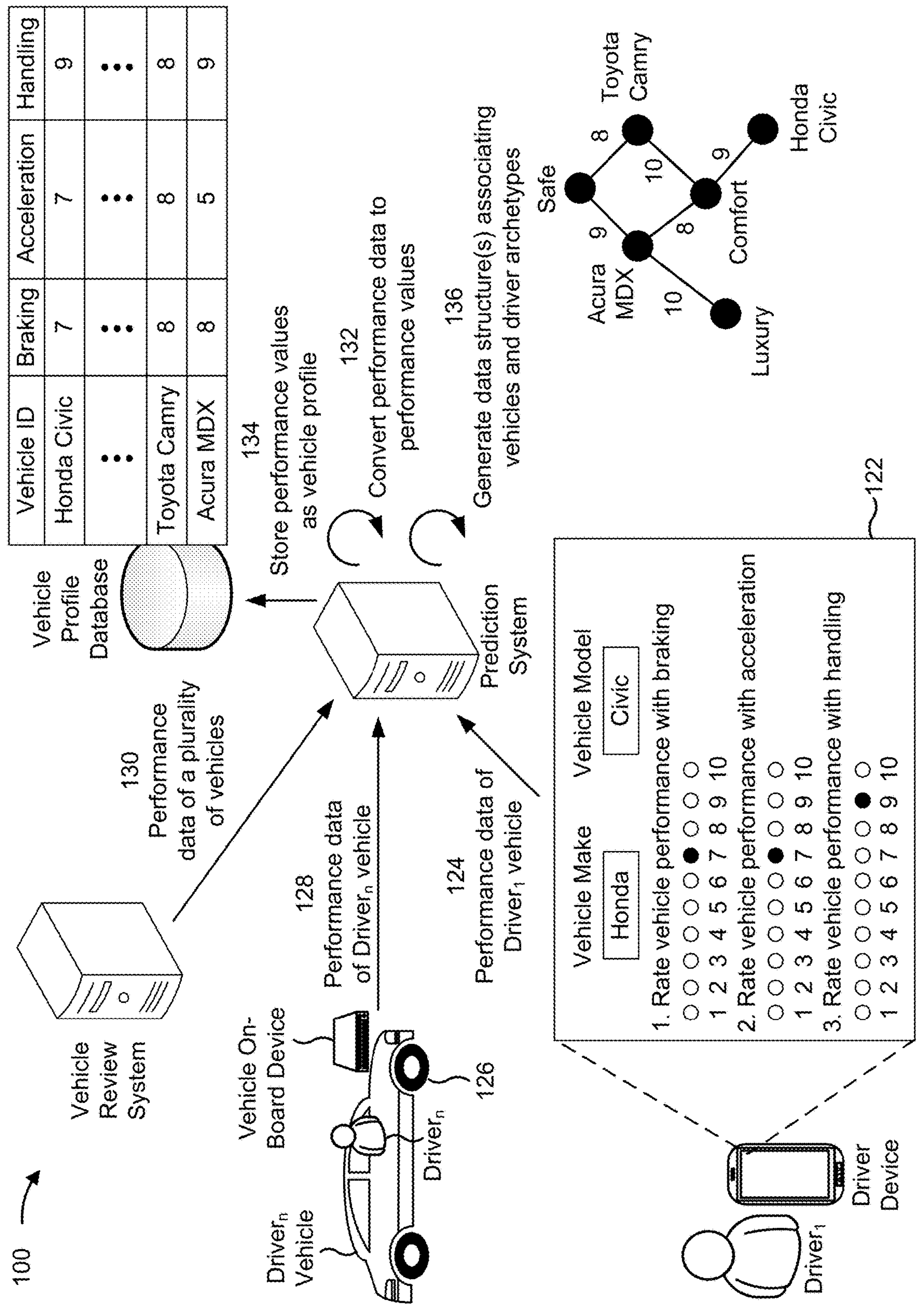

As shown in FIG. 1B, the prediction system may collect vehicle performance data in a variety of ways. In some implementations, the prediction system may receive the vehicle performance data via input from a driver (e.g., a user), such as via the mobile application or web-based application. For example, as shown by reference number 122, the driver device may display a series of queries for the driver (e.g., Driven) to respond and provide a rating of performance of the driver's vehicle in different driving categories. The driving categories may relate to vehicle performance (e.g., braking, acceleration, handling, etc.), vehicle comfort (e.g., the height of the vehicle and/or the driver seat from the ground, the amount of interior space, etc.), and/or vehicle convenience features (e.g., location of dashboard information, location of shifter, type of shifter, etc.).

As further shown by reference number 122, the responses to the queries may be in the form of numeric values (e.g., a value between 1 and 10). The driver may input the numeric value by pressing a designated button or area on the driver device corresponding to the particular value. Alternatively, the user may manually input the numeric value into dedicated entry fields presented on a display of the driver device (e.g., via a physical keyboard, a virtual keyboard, or a voice entry).

Additionally, or alternatively, the response to the queries may be a selection of one option out of multiple options. For example, for a query relating to a height of the vehicle and/or the driver seat from the ground, the options from which the driver may select the response may be "Too High," "Just Right," or "Too Low." The options may be displayed on the device, and the driver may select the option by pressing a designated button or area on the driver device corresponding to the particular option. Additionally, the driver may input the driver's vehicle (e.g., make, model, and/or year), for example, in dedicated entry fields or selections from a list (e.g., a drop-down list) populated on the display of the driver device.

As shown by reference number 124, the prediction system may receive the performance data and the data indicating the vehicle information from the driver device (e.g., over a network). For example, the driver may interact with the driver device to submit responses to the queries, which may cause the driver device to transmit the driver data to the prediction system.

In some implementations, as shown by reference number 126, the performance of the vehicle of a driver (e.g., Driver$_n$) may be measured and/or monitored, for example, by an on-board device of the vehicle. The on-board device may include or communicate with a navigation system that may track and/or measure actual driving metrics of the vehicle (e.g., via one or more sensors and/or devices). The actual driving metrics may include, but are not limited to, vehicle speed, acceleration, deceleration, centripetal force, centrifugal force, and the like. Additionally, or alternatively, the actual vehicle performance metrics may be measured and/or determined via the driver device (e.g., mobile phone) of the driver while operating the vehicle.

As shown by reference number 128, the prediction system may receive, from the on-board (and/or from the driver device), data corresponding to the performance metrics of the vehicle. For example, the vehicle on-board device may transmit the data after a particular route is completed (e.g., after the driver has turned the ignition has turned off or the vehicle has been at a standstill for a set duration) and/or based on driver input (e.g., the driver selects an option presented on a display of the vehicle on-board device to submit the data or a subset of the data to the prediction system). Alternatively, the vehicle on-board device may transmit the data in real-time as the route is in progress (e.g., transmit blocks of data in intervals of 10 seconds). Additionally, or alternatively, the driver device may similarly transmit data after the route is completed, based on driver input, or in real-time when the route is in progress. In some implementations, the vehicle performance metrics may be the same as the actual driving metrics (e.g., the prediction system may process and/or store the same data received from the on-board device and/or driver device under the driver profile and under the vehicle profile. Alternatively, the prediction system may receive, process, and/or store separate sets of data for the vehicle performance and for the actual driving behavior from the on-board device and/or the driver device.

In some implementations, as shown by reference number 130, the prediction system may obtain performance data for a plurality of vehicles from a vehicle review system (e.g., via a third party review website) from which the prediction system may extract performance values for different categories from the vehicle review system. For example, the prediction system may search the code or text associated with the third party review website for tags or keywords relating to the different categories, and extract values and/or grades associated with the tags or keywords. Obtaining performance data from the vehicle review system may provide access to a larger database of vehicles than just the vehicles of the drivers having accounts, which may be limited (e.g., in make, model, and/or year).

As shown by reference number 132, the prediction system may convert the different forms of performance data into a common value system (e.g., into performance values representative of the performance of the vehicle in each driving category) so that the vehicle performance data collected from the different sources may be more easily compared and associated with one another and other data (e.g., driver archetypes).

For example, when the driver directly provides input of performance values for different driving categories (e.g., 7, 7, and 9 for driver categories of braking, acceleration, and handling, respectively, as shown in FIG. 1B), the prediction system may maintain those values as the performance values in a vehicle profile (e.g., no conversion is needed). When the driver selected a particular option from multiple options, the prediction system may assign a numeric importance value for each of the options, and the numeric importance value of the selected option may be included in the driver profile. For example, for a driving category of vehicle/driver seat height from the ground, the options for "Too High," "Just Right," and "Too Low" may be assigned numeric values of 10, 5, and 1, respectively. As such, if the driver selected "Just Right," then the vehicle profile would have a performance value of 5 for the driving category.

When the driving data is in the form of metrics, the prediction system may apply one or more rules to convert the metrics into performance values. For example, the prediction system may assign a performance value for a specific range of values of the metric, as defined in the rules. As an example, if the metrics indicate an average acceleration that is above 10 $m/s^2$, then the prediction system may apply a performance importance value of 10, and if the average acceleration is below 1 $m/s^2$, then the prediction system may apply a performance value of 1.

Additionally, or alternatively, after the performance values have been obtained, the prediction system may further apply a tolerance to each performance value so that the vehicle profile has a range of performance values for each driving category. In some implementations, the tolerance may be a set value (e.g., 1) for all the driving categories. For example, a performance value of 7 would have a range of importance values from 6-8. Alternatively, for driving categories having greater performance (e.g., having a higher performance value), the tolerance value may be greater than for driving categories having less performance (e.g., having a lower performance value). For example, a performance value of 8 may have a tolerance value of 2, for a range of 6-10, whereas a performance value of 5 may have a tolerance value of 1, for a range of 4-6.

In implementations when the performance data is obtained from a vehicle review system, if the reviews are on the same scale as the performance values (e.g., 1 to 10), then the prediction system may maintain the values extracted from the third party reviews. Additionally, or alternatively, if the reviews are on a different scale (e.g., 1 to 5), the prediction system may extrapolate the extracted values to be on the same scale. Additionally, or alternatively, where the extracted data is a letter grade (e.g., A, B, C, D, F), then each letter grade may be assigned a performance value (e.g., A=10, B=8, etc.).

As shown by reference number 134, the prediction system may store the performance data (e.g., performance values or ranges of performance values) for each vehicle in a vehicle profile database as a vehicle profile. The vehicle profile may be associated with a vehicle identifier (e.g., make, model, and/or year of the vehicle).

In some scenarios, the vehicle profile database may have gaps in the vehicles (e.g., vehicle profiles) stored. For example, the vehicle profile database may have vehicles of only a certain year. In such instances, the prediction system may extrapolate the vehicle data for a vehicle of one year to a vehicle of the same make and model for another year that is not included in the vehicle profile database. If the years are within a threshold distance of each other (e.g., 3 years), then the prediction system may use the same vehicle performance values for the vehicle profile of the missing vehicle. If the years are outside of the threshold distance, then the prediction system may apply an adjustment factor. For example, if the vehicle profile in the vehicle profile database is for a vehicle from 2017, then the prediction system may adjust the performance values for a vehicle from 2021 by a value of 0.5 for one or more of the driving categories. The value of the adjustment factor may depend on how far apart the years are (e.g., the greater the difference between years, the greater the adjustment factor may be).

Although FIG. 1B shows the prediction system receiving vehicle performance data for different vehicles from the different data sources, the prediction system may receive vehicle performance data for the same vehicle from more than one of the data sources. In such a scenario, the performance values for each driving category may be an average of the performance values obtained from the different data sources. For example, if the performance values from the performance data received from the driver input (e.g., via the driver device) are 7, 9, and 9 (e.g., for the driving categories related to braking, acceleration, and handling), and the performance values obtained from actual driving metrics (e.g., via the on-board device or the driver device) are 7, 8, and 8, then the performance values for the vehicle profile stored in the vehicle profile database may be 7, 8.5, and 8.5. Additionally, although the performance values are described, with respect to FIG. 1B and elsewhere herein, on a scale of 1-10, the prediction system may use any scale (e.g., 1-50, 1-100, etc.) for the performance values.

In some implementations, the prediction system may determine vehicle clusters in which vehicles have common vehicle profiles. The prediction system may determine the vehicle cluster(s) based on one or more rules. For example, the prediction system may determine a vehicle cluster of all vehicles having the same make or model. Additionally, or alternatively, the prediction system may determine a vehicle cluster of vehicles having performance values within a threshold range of each other (e.g., within 1 value) for a minimum number of vehicle categories (e.g., all of the driving categories, 8 out of 10 driving categories, etc.). Additionally, or alternatively, the prediction system may use a machine learning model (e.g., an unsupervised machine learning model) to determine the vehicle cluster(s), as described in more detail below in connection with FIG. 3.

As shown by reference number 136, the prediction system may generate a data structure indicating a degree of association between a vehicle (or a vehicle cluster) having a vehicle profile in the vehicle profile database, and each driver cluster based on the importance values associated with the drivers in the driver clusters and the performance values of the vehicle (or vehicle cluster). For example, the prediction system may determine and assign a strength of relationship (e.g., as indicated by a strength score) in the data structure between the vehicle (or the vehicle cluster) and a driver archetype associated with each driver cluster based on a proximity between the performance values and the corresponding importance values in the driving categories. For example, as shown in FIG. 1B, an Acura MDX has a very strong relationship with a "Luxury" driver archetype (e.g., a strength value of 10), indicating a high likelihood that a driver with a "Luxury" driver archetype would be compatible with an Acura MDX. The data structure may be a directed graph (e.g., a directed acyclic graph (DAG)), a weighted graph (e.g., a weighted DAG and/or another type of weighted graph), a labeled graph, or the like. Each strength value (e.g., 1 through 10) may have a threshold distance between performance values and corresponding importance values and/or in a threshold number of driving categories. As an example, a vehicle having performance values within 1 value of the corresponding importance values in all of the driving categories may be assigned a strength value of 10. As another example, a vehicle having performance values within 1 value of the corresponding importance values in 8 or 9 of the driving categories may have a strength value of 9. As another example, a vehicle having performance values within 2 values of the corresponding importance values in all of the categories may have a strength value of 9.

In some implementations, the prediction system may also generate data structures between driver archetypes that represent how similar those driver archetypes are with each other. For example, a "Luxury" driver archetype may have moderate similarity with a "Comfort" driver archetype, and a "Sporty" driver archetype may have a weak similarity with a "Safe" driver archetype. Additionally, or alternatively, the prediction system may further generate data structures between different vehicles that indicate how similar the vehicles are with each other. For example, the data structure may indicate a strong similarity between a Honda Civic and a Toyota Camry, but a weak similarity between either a Honda Civic or a Toyota Camry with an Acura MDX. As such, data (e.g., importance values) from a certain driver archetype may be used for another driver archetype having a strong similarity (e.g., where there is more data with respect to the driver archetype). Similarly, data from a certain vehicle (e.g., performance values) from a certain vehicle may be used for another vehicle having a strong similarity. As described above, the degree of similarity may be determined by how close the importance values or performance values of one item or group are with the corresponding importance values or performance values of the other item or group in the relationship. Additionally, or alternatively, the prediction system may determine the degrees of association (e.g., between a driver cluster/driver archetype and a vehicle, between one vehicle and another vehicle, or between one driver archetype and another driver archetype) via a machine learning model, such as described in more detail below in connection with FIG. 3.

Figure 1C:
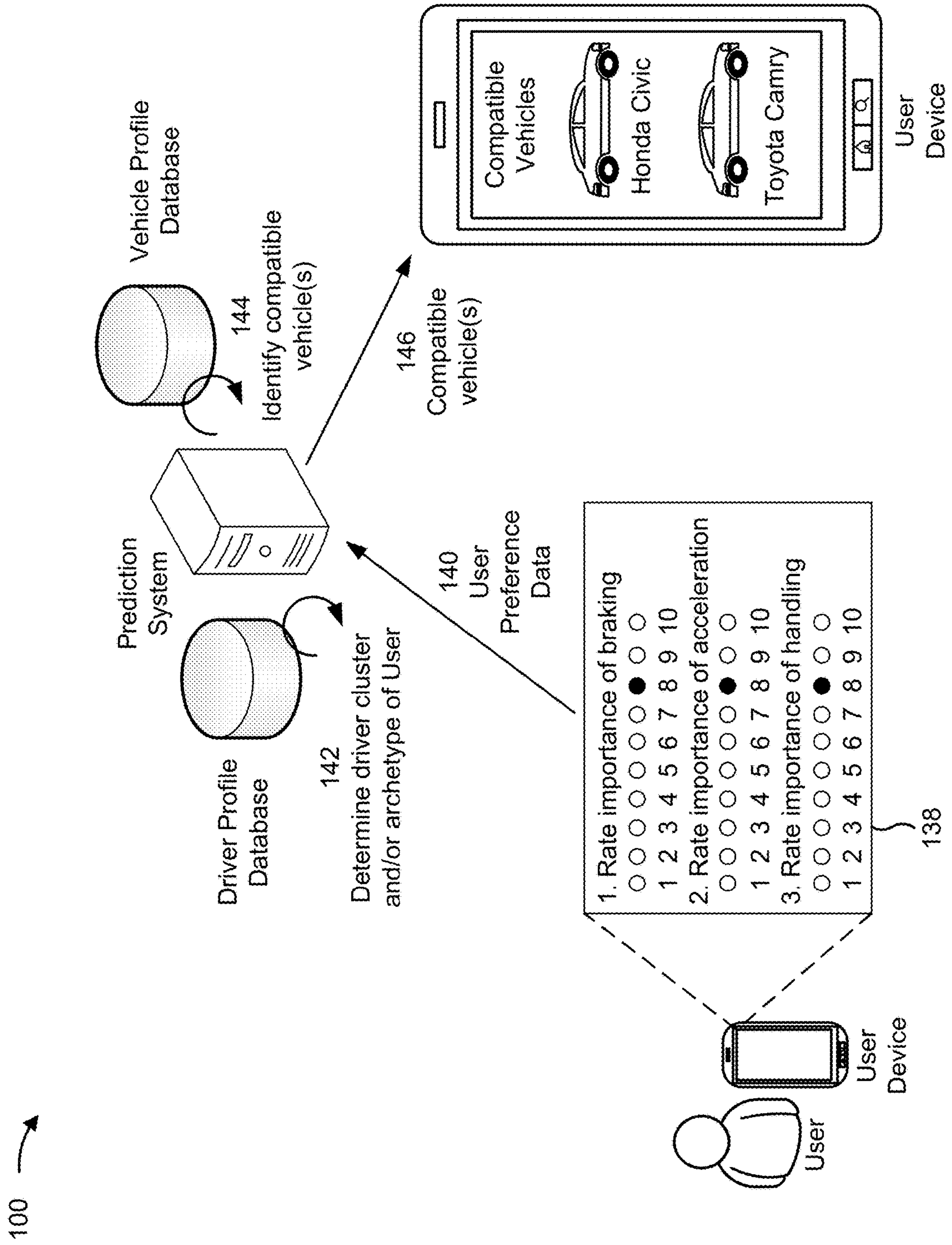

As shown in FIG. 1C, a user may interact with the prediction system (e.g., via an application installed and executed on a user device or via a web-based application accessed by the user device over a network) to find one or more compatible vehicles (e.g., vehicles that the prediction system predicts the user will like). For example, the prediction system may transmit, to the user device, data corresponding to a series of queries regarding the user's driving preferences in different driving categories. As shown by reference number 138, the queries may be displayed on a display of the user device. The user may input the responses to the queries, for example, by pressing designated buttons on the display of the user device (e.g., a touchscreen display). The responses may be in the form of an importance rating (e.g., a numerical rating between 1 and 10). As shown by reference number 140, the prediction system may receive data corresponding to the responses (e.g., the user or driver preference data).

In some implementations, as shown by reference number 142, using the user preference data, the prediction system may determine a driver cluster to which the user belongs. For example, the prediction system may access the driver profile database and search for driver profiles that have similar importance ratings as the user, which the prediction system may determine based on one or more rules. As an example, for a particular driving category, the prediction system may determine that the respective importance values from the user preference data and from the one or more driver profiles are similar if they fall within the same range of values. For example, the prediction system may determine that, in a category for braking, the importance values are similar if they fall within a range of 8-10. The prediction system may determine that the user belongs in a particular driver cluster if the user preference data has similar importance ratings as the driver cluster in a threshold number of categories.

Additionally, or alternatively, the prediction system may use the user preference data to determine a driver archetype in which the user falls. For example, if the user preference data indicates importance values that fall within the ranges of a particular driver archetype for a minimum number of the driving categories (e.g., all of the driving categories, 8 out of 10 driving categories, etc.), then the prediction system may apply that driver archetype to the user. As an example, a driver archetype of a "Safe" driver may have importance value ranges of 8-10 for braking, 6-8 for acceleration, and 7-9 for handling. User preference data indicating importance values of 10, 7, and 7 would have a "Safe" driver archetype. In some implementations, the prediction system may store the user preference data in the driver profile database under the user's account.

Alternatively, the user may have an account associated with a driver profile and a driver identifier stored in the driver profile database (e.g., $Driver_1$, $Driver_2$ . . . $Driver_n$). In such a scenario, the prediction system may obtain the user's account via the user's driver identifier, which may be received from the user device (e.g., when the user logs into the user's account via the application) and obtain the user's driver profile, which includes the driver's driving data (e.g., importance values) and/or the driving archetype.

As shown by reference number 144, the prediction system may identify one or more compatible vehicles for the user based on the driver cluster and/or driver archetype of the driver and the data structure. For example, the prediction system may identify vehicles having strength values in the data structure above a threshold value (e.g., strength value of at least 9). As shown in FIG. 1C, the user preference data has importance ratings of 8 for braking, 8 for acceleration, and 8 for handling, which may be associated with a driver archetype of "Comfort" (as shown in the table of FIG. 1A). From the data structure (shown in FIG. 1B), the compatible vehicles (e.g., with a compatibility score of 9 or higher, as described in more detail below in connection with FIGS. 2A and 2B) may be a Honda Civic and a Toyota Camry. As shown by reference number 146, the prediction system may transmit (e.g., to the user device) data indicating the compatible vehicles. The user device may display images of the compatible vehicles and related information (e.g., performance values, performance metrics, etc.).

Figure 1D:
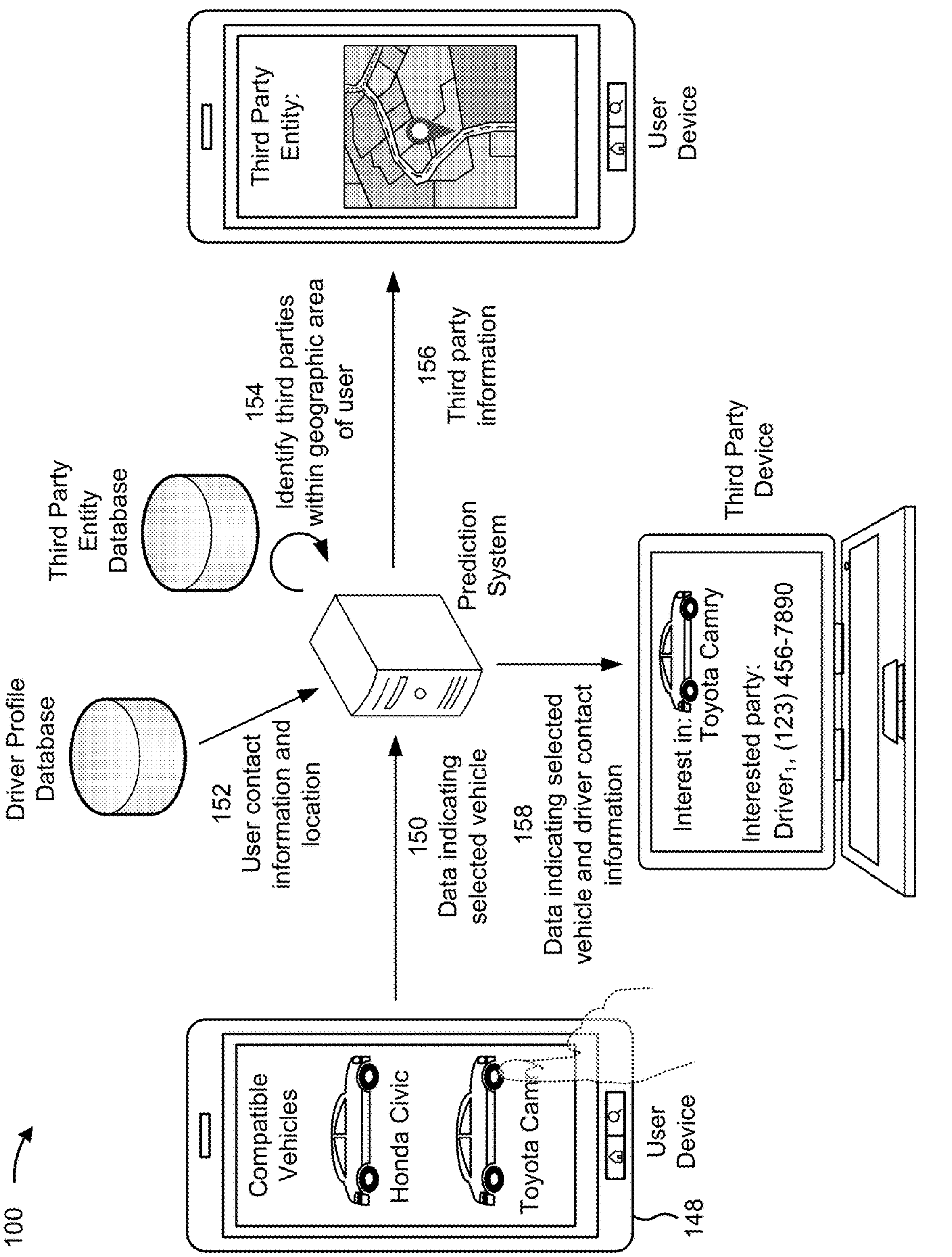

As shown in FIG. 1D, and by reference number 148, the user may select one of the compatible vehicles (e.g., by pressing a button on a display of the user device corresponding to the particular vehicle). As shown by reference number 150, the prediction system may receive data indicating the selected vehicle from the driver device. The prediction system may then obtain user contact information (e.g., name, address, zip code, and/or phone number of the user). For example, as shown by reference number 152, the prediction system may obtain data indicating the user contact information from the driver profile database if the user has an account. Additionally, or alternatively, the user may be prompted to provide the user's contact information (e.g., input in designated entry fields via the user device). Thus, the prediction system may receive the data corresponding to the user's contact information directly from the user device. As shown by reference number 154, the prediction system then may identify one or more third party entities (e.g., dealerships or rental agencies) from a third party entity database that is within a threshold distance (e.g., 10 miles, 50 miles, etc.) from the user based on the user's contact information and/or that has the selected vehicle in inventory. The user may be able to specify the threshold distance (e.g., when submitting the selected vehicle).

As shown by reference number 156, the prediction system may transmit, to the user device, data corresponding to the third party information, such as the name, address, contact information, and inventory including the selected vehicle. As shown by reference number 158, the prediction system may transmit, to a third party device of any identified third parties, data associated with the selected vehicle and/or the contact information of the user. As such, the third party entity may anticipate interest in particular vehicles. Additionally, even if the third party entity does not have the suggested vehicle in inventory, the third party entity may be able to use the information to determine which vehicles are more popular and therefore attempt to obtain those vehicles for the inventory.

As explained above, the system utilizes data related to drivers' driving behavior (e.g., importance values) and associates that data with actual performance data of vehicles (e.g., performance values). By determining and applying relationships between the data, the system may provide greater accuracy in predicting compatibility between a consumer (e.g., a driver) and vehicles (e.g., compared to systems only considering consumer preferences and vehicle statistics).

As indicated above, FIGS. 1A-1D are provided as an example. Other examples may differ from what is described with regard to FIGS. 1A-1D.

Figure 2A:
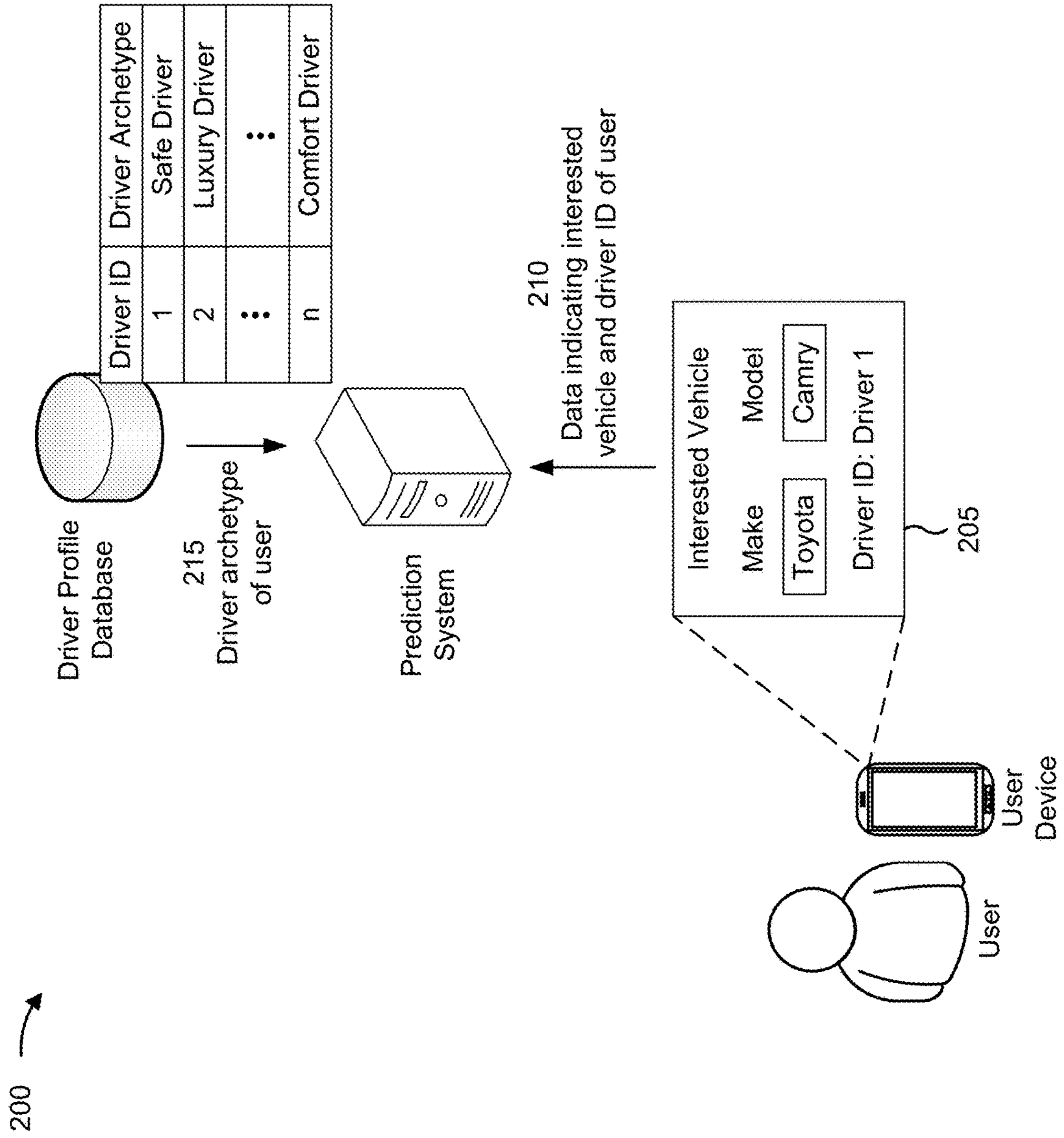
FIGS. 2A-2B are diagrams of another example implementation relating to predicting driver-vehicle compatibility.
Figure 2B:
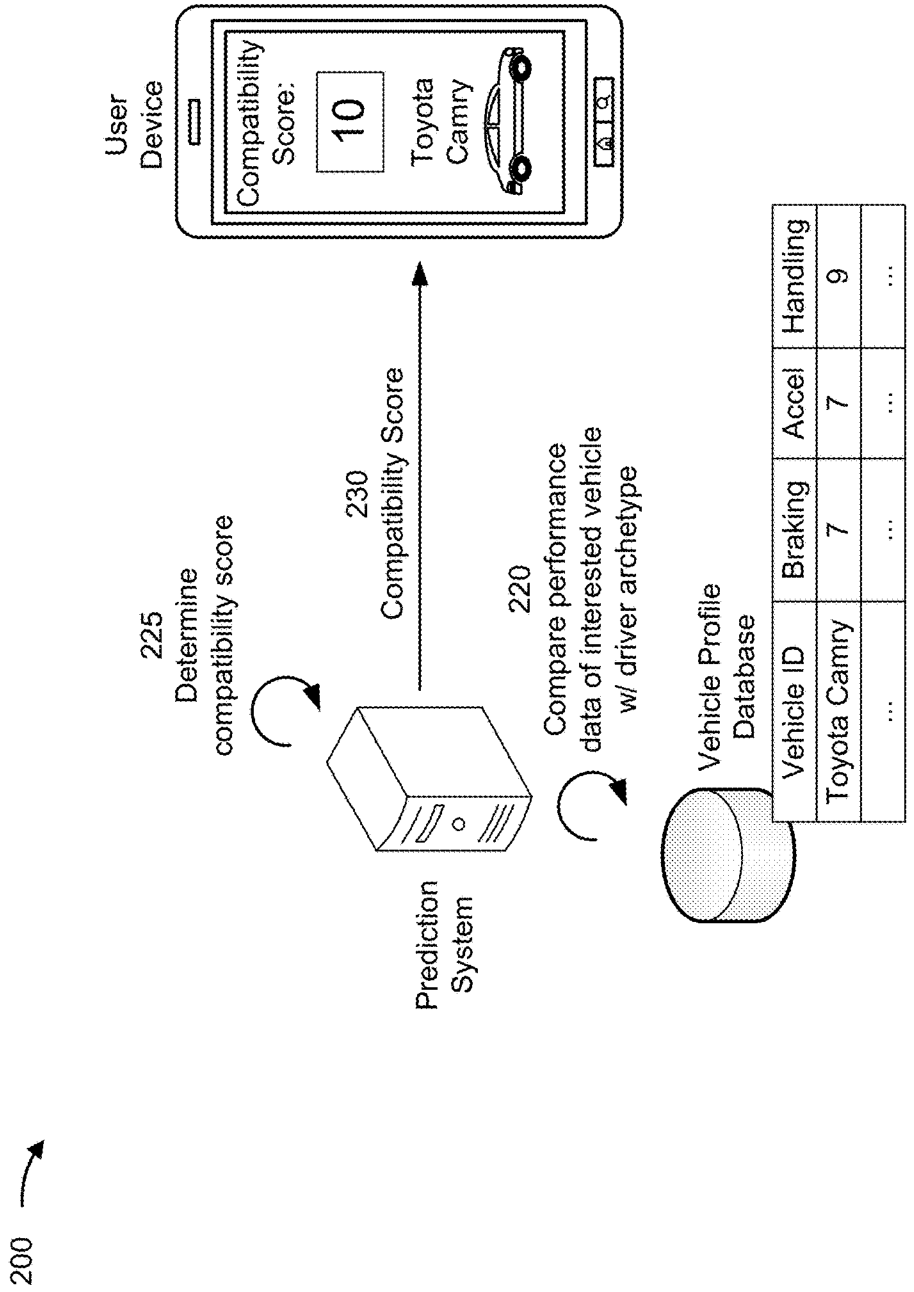

FIGS. 2A-2B are diagrams of an example 200 associated with predicting driver-vehicle compatibility. As shown in FIGS. 2A-2B, example 200 includes a user device, a prediction system, a driver profile database, and a vehicle profile database. These devices are described in more detail in connection with FIGS. 4 and 5.

As shown in FIG. 2A, a user may be interested in finding out how compatible the user is with a particular vehicle, and therefore, may query the prediction system for a compatibility score (e.g., via an application installed and executed on the user device or via a web-based application accessed by the user device over a network). As shown by reference number 205, the user may provide information for the vehicle (e.g., a make and model of the vehicle). For example, the user may enter the vehicle information into dedicated entry fields presented on a display of the user device (e.g., via a physical keyboard, a virtual keyboard, or a voice entry). As shown by reference number 210, the prediction system may receive, from the user device, data indicating the vehicle. Alternatively, the prediction system may transmit data corresponding to all the vehicles (e.g., data indicating the vehicle identifiers from the vehicle profile database) or a subset of the vehicles (e.g., vehicles compatible with the user's driver profile, as described elsewhere herein) to the user device to be displayed (e.g., as photo tiles and/or in a drop-down menu). Alternatively, the user may browse a database of vehicles (e.g., a website via the user device). In either scenario, the user may select a particular vehicle for which the user is interested in determining the compatibility, and the user device may transmit data indicating the selected vehicle to the prediction system.

Additionally, the prediction system may also receive, from the user device, a driver identifier associated with an account of the user. The driver identifier may automatically be associated with the user's compatibility query, for example, by way of the user logging into the user's account (e.g., via the application) to initiate the query. Alternatively, the user may manually input the driver identifier, for example, before, after or at the same time as the vehicle information. From the driver identifier, the prediction system may access the user's account and the driver information associated with the user, including a driver archetype assigned to the user based on the driving data provided to the prediction system, as described elsewhere herein. As shown by reference number 215, the prediction system may identify the driver archetype associated with the user (e.g., based on the driver profile). Alternatively, when the driver archetype of the user is not known or stored in the driver profile database, the prediction system may transmit data corresponding to a series of queries regarding the user's driver behavior in different driving categories (e.g., as described above in connection with reference number 102 and shown in FIG. 1A). The prediction system may receive data indicating the user's responses to the queries, and from the data, may determine the driver archetype (e.g., as described above in connection with reference number 118).

As shown in FIG. 2B, the prediction system may use the driver archetype and the vehicle information to determine a compatibility score. From the vehicle information (e.g., make and model), the prediction system may obtain, from the vehicle profile database, a vehicle profile associated with a vehicle identifier corresponding to the provided vehicle information. The vehicle profile may include performance data (e.g., performance values) for multiple driving categories (e.g., braking, acceleration, handling, etc.). As shown by reference number 220, the prediction system may compare the performance data (e.g., performance values) of the vehicle with data corresponding to the driver archetype of the user (e.g., importance values).

As shown by reference number 225, based on the comparison, the prediction system may determine a compatibility score based on one or more rules. For example, the compatibility score may depend upon how close the performance values of the vehicle and the importance values associated with the driver archetype are within each other across the different categories. As an example, if the performance values and the importance values are within a threshold amount for all the driving categories, the compatibility score may be 10. If the performance values and the importance values are outside the threshold amount for all the driving categories, the compatibility score may be 0. In some implementations, the compatibility score may be determined based on a machine learning model, as described in more detail below in connection with FIG. 3. As shown by reference number 230, the prediction system may transmit, to the user device, data indicating the compatibility score to be displayed on the user device.

In some implementations, after the user has actually driven the vehicle (e.g., after purchasing the vehicle, renting the vehicle, or test driving the vehicle), the prediction system may transmit, to the user device, data indicating one or more queries requesting the user's satisfaction with the vehicle in one or more driving categories (e.g., braking, acceleration, handling, etc.). For example, the user device may display dedicated entry fields for the user to select and/or enter a satisfaction score (e.g., a numerical value between 1 and 10). Additionally, or alternatively, the prediction system may transmit the queries to a third party device, such as at a dealership or a rental agency, via which the responses to the queries may be input by an agent of the third party entity. In implementations in which the compatibility score is determined using a machine learning model, the prediction system may use the satisfaction score to retrain the machine learning model (e.g., if the satisfaction score differs from the compatibility score by a threshold amount).

In some implementations, when the user has not provided a vehicle, such as in example 100 described above, the prediction system may calculate compatibility scores for all of the vehicles having vehicle profiles in the vehicle profile database. Alternatively, the prediction system may determine a subset of the vehicles determined to be compatible with the user (e.g., based on the user preference data as explained above) and provide data indicating the compatible vehicles to the user device in order of compatibility (e.g., the vehicles with the highest compatibility score first).

As explained above, the system utilizes driver archetypes, for which data (e.g., importance values) has been collected, processed, and stored, to compare with performance data of vehicles (e.g., performance values) to determine compatibility scores. The compatibility scores provide a quantifiable metric to determine compatibility between a consumer (e.g., a driver) and a particular vehicle.

As indicated above, FIGS. 2A-2B are provided as an example. Other examples may differ from what is described with regard to FIGS. 2A-2B.

Figure 3:
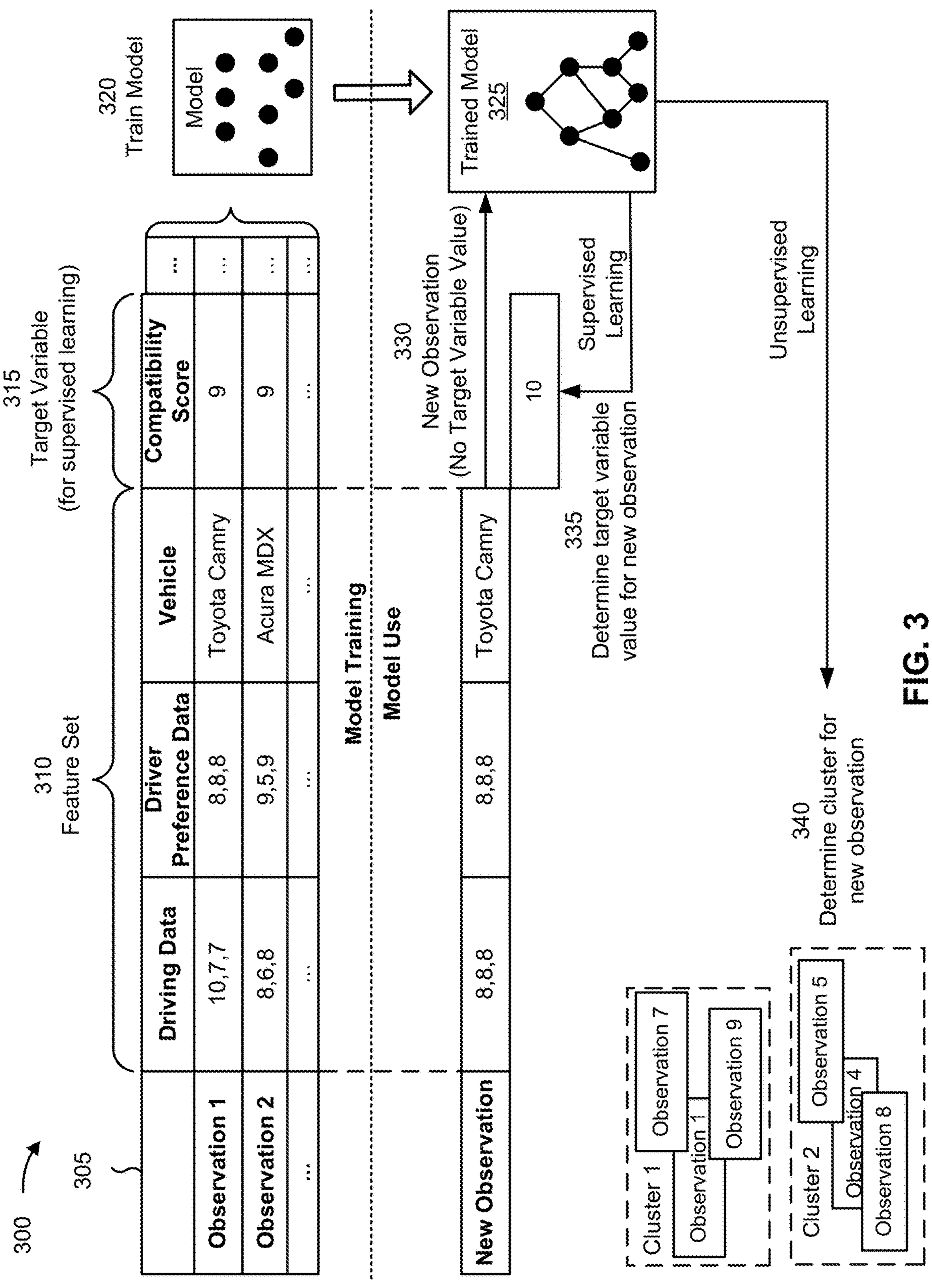
FIG. 3 is a diagram illustrating an example of training and using a machine learning model in connection with predicting driver-vehicle compatibility.

FIG. 3 is a diagram illustrating an example 300 of training and using a machine learning model in connection with predicting driver-vehicle compatibility. The machine learning model training and usage described herein may be performed using a machine learning system. The machine learning system may include or may be included in a computing device, a server, a cloud computing environment, or the like, such as the prediction system described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from a user device, a driver device, a prediction system, a driver profile database, and/or a vehicle profile database, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user or driver device, the prediction system, the driver profile database, and/or the vehicle profile database. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include driving data (e.g., importance values in a plurality of categories indicating a driver's driving behavior), driver preference data (e.g., importance values in the plurality of categories indicating the driver's driving preferences), a vehicle (e.g., a selected vehicle by the driver from one or more suggested vehicles), and so on. As shown, for a first observation, the first feature may have a value of "10, 7, 7" (representative of importance values, such as those converted from actual driving metrics, in driving categories such as braking, acceleration, and handling), the second feature may have a value of "8, 8, 8" (representative of importance values in the same driving categories as in the first feature set), the third feature may have a value of "Toyota Camry," and so on. These features and feature values are provided as examples, and may differ in other examples. For example, the feature set may include one or more of the following features: driver archetypes (e.g., casual driver, sporty driver, comfort driver, safe driver, luxury driver, etc.), vehicle performance data (e.g., performance values of vehicles having vehicle profiles stored in the vehicle profile database) and/or vehicle archetypes or categories (e.g., sports, luxury, off-roading, coupe, convertible, sedan, etc.).

In some implementations, the observations used to train a machine learning model may be user-specific. For example, a machine learning model may be trained for and/or applied to a particular user or driver, and the observations may be based on driving behavior and/or driving preferences associated with that particular user or driver. Alternatively, the observations used to train a machine learning model may be associated with other drivers obtained from the driver profile database and associated with respective driver identifiers. For example, the observations may be based on driving behavior of all drivers having accounts stored in the driver profile database. Alternatively, the observations may be based on driving behavior of a subset of drivers, such as one or more clusters of users to which the particular user or driver belongs (e.g., based on specific common characteristics, as described below). Thus, the prediction system and/or the machine learning system may train multiple machine learning models for different users/drivers and/or clusters of drivers, and may select a machine learning model to be applied to determine suggested categories for a user/driver based on the user/driver and/or a cluster to which the user/driver belongs.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is a compatibility score (e.g., a score indicating a level of compatibility between the user/driver and the vehicle in the feature set), which has a value of "9" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In the supervised learning model shown in FIG. 3, the target value may be determined by one or more rules (e.g., based on a comparison of driving data and driver preference data with vehicle performance data), as described elsewhere herein. Additionally, or alternatively, a target value of initial observations (e.g., the compatibility scores of the first observation, second observation, etc.) may be based on feedback on a user's satisfaction with the vehicle after the user has actually driven the vehicle, for example, after an actual test drive of the vehicle, renting the vehicle, or a simulation of driving with the vehicle. For example, the user may input, via the user device, a satisfaction score, as described elsewhere herein. The user inputting the satisfaction score may be the same user whose driving data and driver preference data are used in the particular observation, or may be a different user having a similar driver profile (e.g., importance values within a threshold distance in a minimum number of driving categories). The machine learning model may be trained using the satisfaction scores to determine the compatibility scores for future observations.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of "8, 8, 8," a second feature of "8, 8, 8," a third feature of "Toyota Camry," and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed.

As an example of a supervised learning model, the trained machine learning model 325 may predict a value of "10" for the interaction category for the new observation, as shown by reference number 335. Based on this prediction, the machine learning system may provide a first recommendation. The first recommendation may include, for example, a compatibility score representative of the compatibility between the user and a particular vehicle. In some implementations, the machine learning model may determine, for each vehicle out of a plurality of vehicles, a compatibility score associated with that vehicle. For example, the machine learning model may determine a compatibility score for a first vehicle, a compatibility score for a second vehicle, and so on. The machine learning model may output data corresponding to a set of vehicles for which a corresponding set of compatibility scores satisfy a threshold (e.g., a minimum compatibility score of 9). These categories may be used by the processing system as compatible vehicles to provide to the user device, as described above in connection with FIG. 1C.

In some implementations, the prediction system and/or the machine learning system may train and/or apply an unsupervised machine learning model, such as to cluster drivers or to cluster vehicles. To cluster drivers, the observations may include driver archetypes, demographic information (e.g., sex and/or age group), geographic location (e.g., zip code or drivers within a threshold distance of a common location) of the drivers, and/or use of adaptive driving equipment, among other examples. To cluster vehicles, the observations may include a make and/or model of the vehicles, among other examples. In these cases, the output of the machine learning model may include information that identifies a cluster to which a new observation belongs and/or information that indicates a degree of similarity between the new observation and one or more other observations. As an example of an unsupervised learning model, the trained machine learning model 325 may classify (e.g., cluster) the new observation in a cluster, as shown by reference number 340. The observations within a cluster may have a threshold degree of similarity. For example, the drivers in the cluster of drivers may have the same driver archetype and/or driver profiles having similar driving data and/or driver preference data (e.g., importance values within threshold amounts of each other in a threshold number of driving categories, as described elsewhere herein). Additionally, the clusters of drivers may be refined based on one or more other similarities, such as the same sex (e.g., all male), the same age group (e.g., all between the ages of 25-40), and/or the same geographic location (e.g., zip code). As another example, the vehicles in the cluster of vehicles may have similar vehicle profiles (e.g., performance values within threshold amounts of each other in a threshold number of driving categories, as described elsewhere herein). Additionally, the clusters of drivers may be refined based on one or more other similarities, such as the same make, model, and within a same group of years (e.g., 2018-2021).

In this way, the machine learning system may apply a rigorous and automated process to provide suggestions of categories for interactions between the user and the terminal. The machine learning system enables recognition and/or identification of tens, hundreds, thousands, or millions of features and/or feature values for tens, hundreds, thousands, or millions of observations, thereby increasing accuracy and consistency and reducing delay associated with providing compatibility scores for drivers with particular vehicles relative to requiring computing resources to be allocated for tens, hundreds, or thousands of operators to manually provide compatibility scores for the drivers with the particular vehicles using the features or feature values.

As indicated above, FIG. 3 is provided as an example. Other examples may differ from what is described in connection with FIG. 3.

Figure 4:
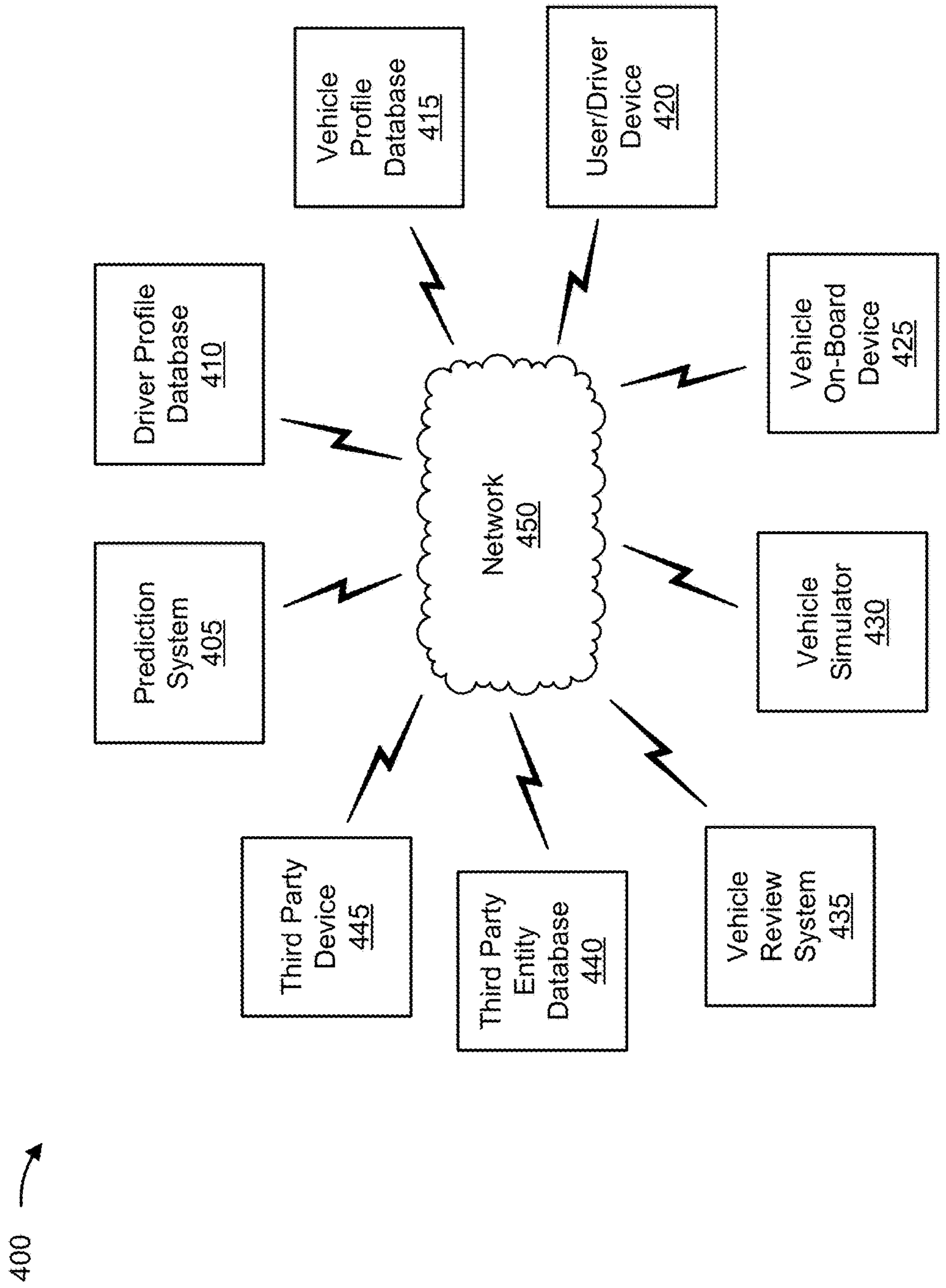
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a prediction system 405, a driver profile database 410, a vehicle profile database 415, a user or driver device 420, a vehicle on-board device 425, a vehicle simulator 430, a vehicle review system 435, a third party entity database 440, a third party device 445, and a network 450. Devices of environment 400 may interconnect via wired connections, wireless connections, or a combination of wired and wireless connections.

The prediction system 405 includes one or more devices capable of receiving, generating, storing, processing, providing, and/or routing information associated with predicting driver-vehicle compatibility, as described elsewhere herein. The prediction system 405 may include a communication device and/or a computing device. For example, the prediction system 405 may include a server, such as an application server, a client server, a web server, a database server, a host server, or a server in a cloud computing system. In some implementations, the prediction system 405 includes computing hardware used in a cloud computing environment.

The driver profile database 410 includes one or more devices capable of receiving, generating, storing, processing, and/or providing information associated with predicting driver-vehicle compatibility, as described elsewhere herein. The driver profile database 410 may include a communication device and/or a computing device. For example, the driver profile database 410 may include a data structure, a database, a data source, a server, a database server, an application server, a client server, a web server, a host server, a virtual server (e.g., executing on computing hardware), a server in a cloud computing system, a device that includes computing hardware used in a cloud computing environment, or a similar type of device. As an example, the driver profile database 410 may store account information, including an account identifier, of one or more drivers. The account information may include driving data for each driver, such as driving behavior measured during vehicle operation and a plurality of importance values corresponding to a plurality of driving categories associated with the driving behavior. The account information may also include each driver's contact information.

The vehicle profile database 415 includes one or more devices capable of receiving, generating, storing, processing, and/or providing information associated with predicting driver-vehicle compatibility, as described elsewhere herein. The vehicle profile database 415 may include a communication device and/or a computing device. For example, the vehicle profile database 415 may include a data structure, a database, a data source, a server, a database server, an application server, a client server, a web server, a host server, a virtual server (e.g., executing on computing hardware), a server in a cloud computing system, a device that includes computing hardware used in a cloud computing environment, or a similar type of device. As an example, the vehicle profile database 415 may store vehicle information, including a vehicle identifier (e.g., a make and/or a model), of one or more vehicles. The vehicle information may include, for each vehicle, data indicating a plurality of performance values corresponding to a plurality of driving categories.

The user or driver device 420 includes one or more devices capable of receiving, generating, storing, processing, and/or providing information associated with predicting driver-vehicle compatibility, as described elsewhere herein. The user or driver device 420 may include a communication device and/or a computing device. For example, the user or driver device 420 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, a user device and a driver device may be the same device. In some implementations, a user device and a driver device may be different devices.

The vehicle on-board device 425 may include one or more communication components (e.g., one or more wireless communication components and/or one or more wired communication components) to communicate with one or more other devices of FIG. 4. For example, the vehicle on-board device 425 may include a wireless wide area network communication component to communicate with a radio access network to communicate with the prediction system 405 and/or the user or driver device 420. As another example, the vehicle on-board device 425 may include a local area network communication component (e.g., a WiFi communication component), a personal area network communication component (e.g., a Bluetooth communication component), and/or a wired communication component (e.g., a Universal Serial Bus communication component and/or a car area network communication component) to communicate with the user or driver device 420.

The vehicle on-board device 425 may also include or communicate with a navigation system that includes one or more devices capable of determining and/or outputting route information for navigating a route, as described elsewhere herein. For example, the navigation system may include a global navigation satellite system (GNSS) device, a Global Positioning System (GPS) device, or the like. Additionally, or alternatively, the navigation system may be integrated into the user or driver device 420.

The vehicle simulator 430 may include one or more devices capable of receiving, determining, processing, storing, and/or providing information associated with a virtual reality (VR) environment (e.g., a VR driving environment). For example, the vehicle simulator 430 may include a server device (e.g., a host server, a web server, an application server, etc.), a cloud device, a data center device, or a similar device. In some implementations, the vehicle simulator 430 may be associated with a VR program that includes a VR driving environment (e.g., an environment in which a user operates a vehicle). The VR program may be a computer program designed to perform a group of coordinated functions, tasks, or activities for the vehicle simulator 430. For example, the VR program may integrate the vehicle simulator 430 with a graphical user interface (GUI) of the vehicle simulator 430.

The vehicle simulator 430 may also include one or more vehicle components, such as a steering wheel, a gas pedal, and a brake pedal. The vehicle simulator 430 may also include one or more sensors in connection with the steering, wheel, the gas pedal, and the brake pedal. For example, a sensor in connection with the steering wheel may measure the angular velocity at which a user rotates the steering wheel. As another example, sensors in connection with the gas pedal and brake pedal may measure displacement of the pedals and/or force applied to the pedals. From such measurements, the vehicle simulator 430 may determine simulated driving metrics, such as vehicle speed, acceleration, deceleration, centripetal force, centrifugal force, and the like and/or transmit the measurements to the prediction system 405 to determine such metrics. Additionally, the vehicle simulator 430 may incorporate any other mechanisms (e.g., hydraulic systems) to simulate driving conditions, such as tilting and/or shaking of the vehicle.

The vehicle review system 435 includes one or more devices capable of receiving, generating, storing, processing, providing, and/or routing information associated with predicting driver-vehicle compatibility, as described elsewhere herein. The vehicle review system 435 may include a communication device and/or a computing device. For example, the vehicle review system 435 may include a server, such as an application server, a client server, a web server, a database server, a host server, or a server in a cloud computing system. In some implementations, the vehicle review system 435 includes computing hardware used in a cloud computing environment.

The third party entity database 440 includes one or more devices capable of receiving, generating, storing, processing, and/or providing information associated with predicting driver-vehicle compatibility, as described elsewhere herein. The third party entity database 440 may include a communication device and/or a computing device. For example, the third party entity database 440 may include a data structure, a database, a data source, a server, a database server, an application server, a client server, a web server, a host server, a virtual server (e.g., executing on computing hardware), a server in a cloud computing system, a device that includes computing hardware used in a cloud computing environment, or a similar type of device. As an example, the third party entity database 440 may store third party entity information, including a third party identifier, of one or more third party entities (e.g., a dealership or a rental agency). The third party entity information may include data corresponding to inventory of each third party entity (e.g., vehicle inventory). The third party entity information may also include the geographic location (e.g., address, zip code, and/or geographic coordinate) of each third party entity.

The third party device 445 includes one or more devices capable of receiving, generating, storing, processing, and/or providing information associated with predicting driver-vehicle compatibility, as described elsewhere herein. The third party device 445 may include a communication device and/or a computing device. For example, the third party device 445 may include a wireless communication device, a user equipment, a laptop computer, a tablet computer, a desktop computer, or a similar type of device.

The network 450 includes one or more wired and/or wireless networks. For example, the network 450 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 450 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
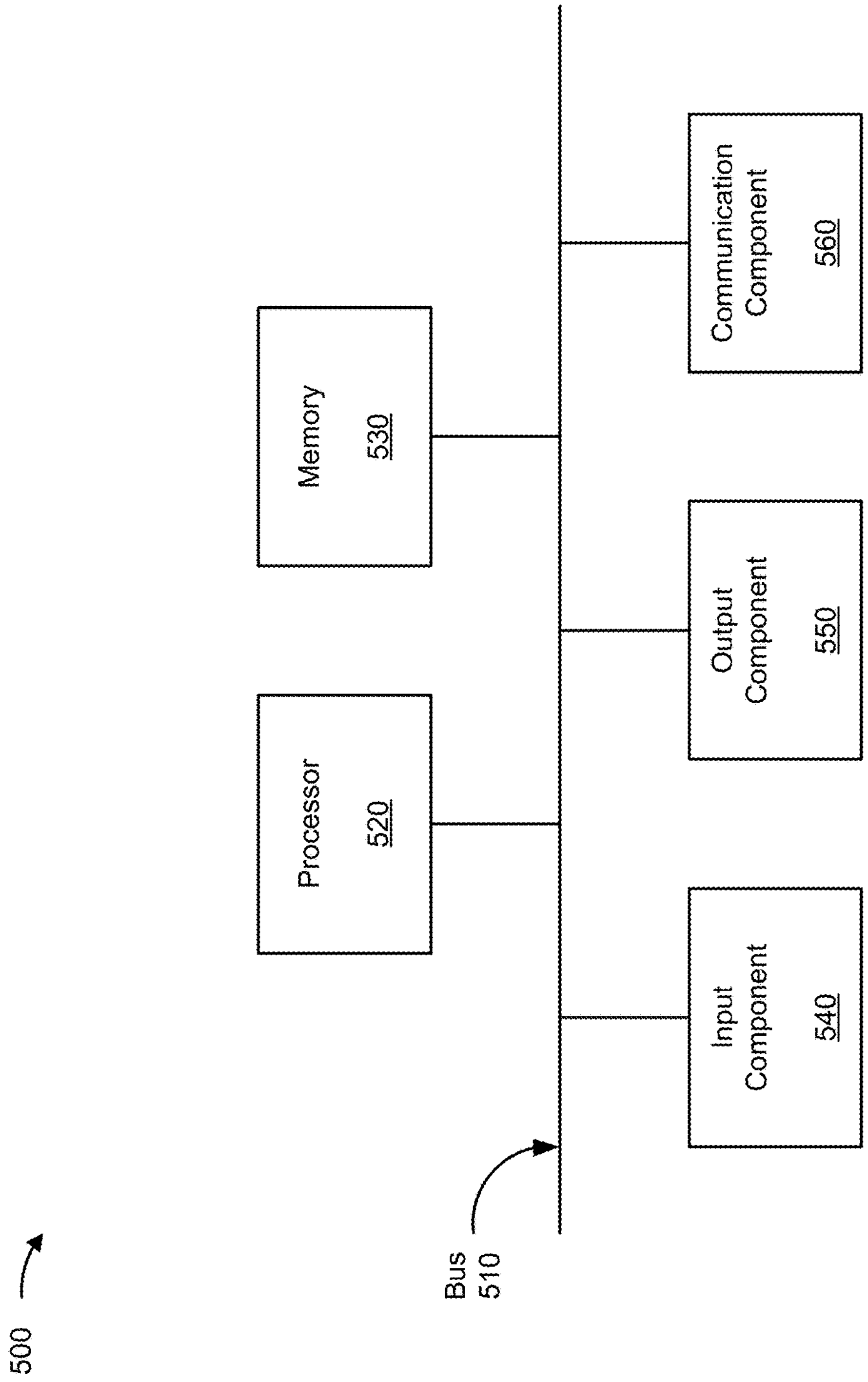
FIG. 5 is a diagram of example components of one or more devices of FIG. 2.

FIG. 5 is a diagram of example components of a device 500, which may correspond to the prediction system 405, the driver profile database 410, the vehicle profile database 415, the user or driver device 420, the vehicle on-board device 425, the vehicle simulator 430, the vehicle review system 435, the third party entity database 440, and/or the third party device 445. In some implementations, the prediction system 405, the driver profile database 410, the vehicle profile database 415, the user or driver device 420, the vehicle on-board device 425, the vehicle simulator 430, the vehicle review system 435, the third party entity database 440, and/or the third party device 445 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
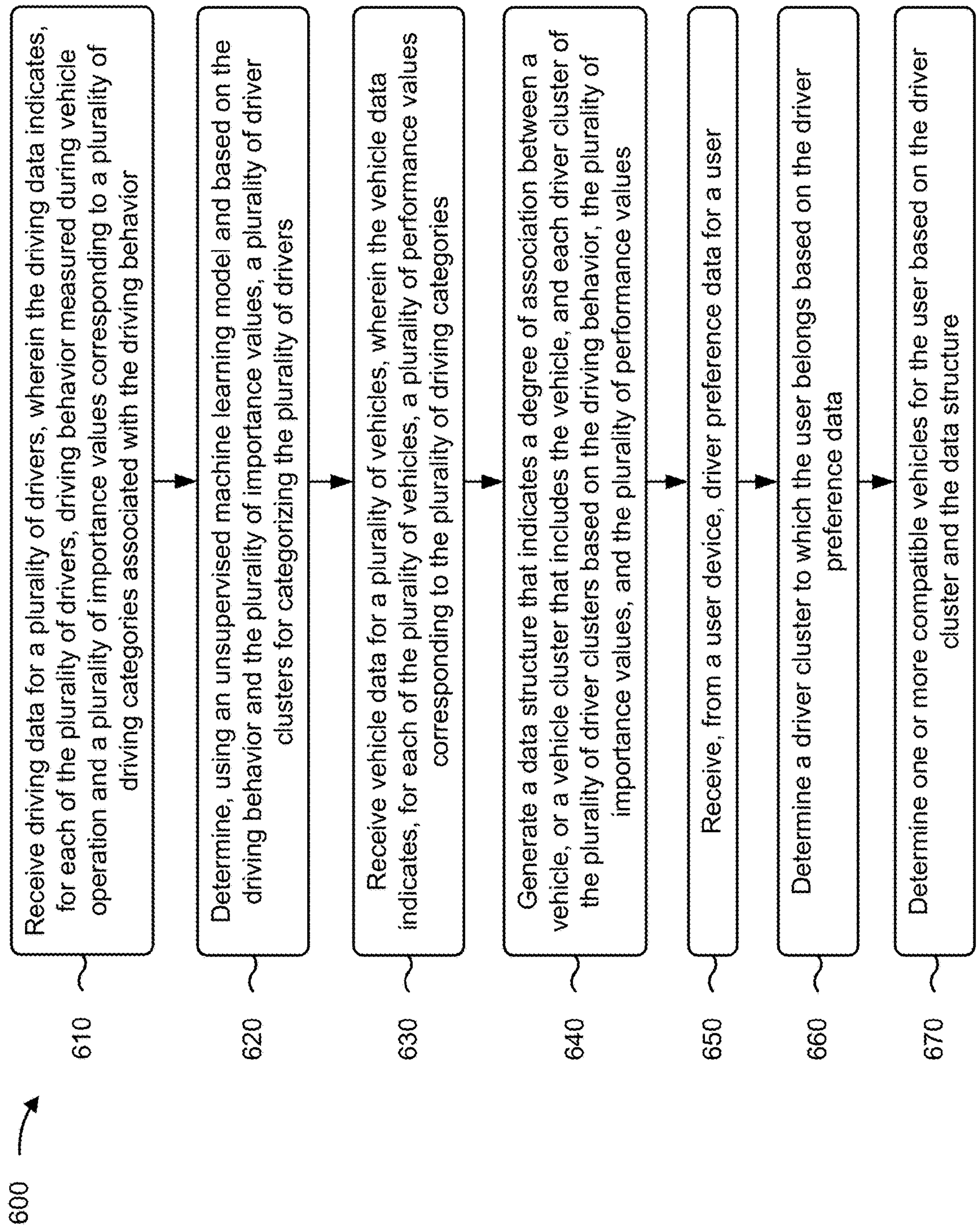
FIGS. 6 and 7 are flowcharts of example processes relating to predicting driver-vehicle compatibility.

FIG. 6 is a flowchart of an example process 600 associated with predicting driver-vehicle compatibility. In some implementations, one or more process blocks of FIG. 6 may be performed by a system (e.g., prediction system 405). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving driving data for a plurality of drivers, wherein the driving data indicates, for each of the plurality of drivers, driving behavior measured during vehicle operation and a plurality of importance values corresponding to a plurality of driving categories associated with the driving behavior (block 610). As further shown in FIG. 6, process 600 may include determining, using an unsupervised machine learning model and based on the driving behavior and the plurality of importance values, a plurality of driver clusters for categorizing the plurality of drivers (block 620). As further shown in FIG. 6, process 600 may include receiving vehicle data for a plurality of vehicles, wherein the vehicle data indicates, for each of the plurality of vehicles, a plurality of performance values corresponding to the plurality of driving categories (block 630). As further shown in FIG. 6, process 600 may include generating a data structure that indicates a degree of association between a vehicle, or a vehicle cluster that includes the vehicle, and each driver cluster of the plurality of driver clusters based on the driving behavior, the plurality of importance values, and the plurality of performance values (block 640). As further shown in FIG. 6, process 600 may include receiving driver preference data for a user (block 650). The driver preference data may include data measured during vehicle operation and an importance value for each driving category of the plurality of driving categories. As further shown in FIG. 6, process 600 may include determining a driver cluster, of the plurality of driver clusters, to which the user belongs based on the driver preference data (block 660). As further shown in FIG. 6, process 600 may include determining one or more compatible vehicles for the user based on the driver cluster and the data structure (block 670).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
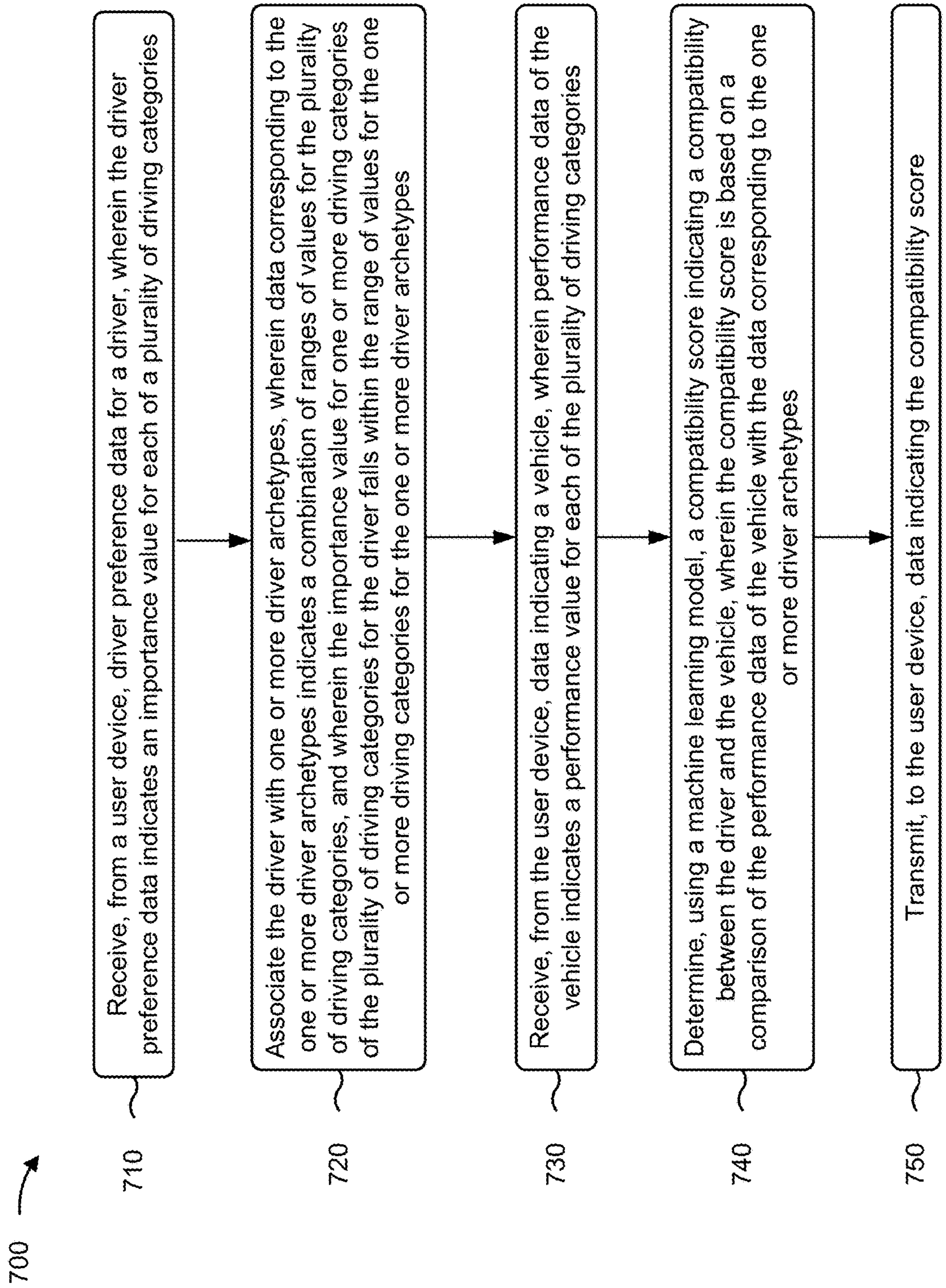

FIG. 7 is a flowchart of an example process 700 associated with predicting driver-vehicle compatibility. In some implementations, one or more process blocks of FIG. 7 may be performed by a system (e.g., prediction system 405). Additionally, or alternatively, one or more process blocks of FIG. 7 may be performed by one or more components of device 500, such as processor 520, memory 530, input component 540, output component 550, and/or communication component 560.

As shown in FIG. 7, process 700 may include receiving driver preference data for a driver, wherein the driver preference data indicates an importance value for each of a plurality of driving categories (block 710). As further shown in FIG. 7, process 700 may include associating the driver with a driver archetype (block 720). Data corresponding to the driver archetype may indicate a combination of ranges of values for the plurality of driving categories. An individual importance value for a driving category, of the plurality of driving categories, for the driver may fall within a corresponding range of values for the driving category in connection with the driver archetype. As further shown in FIG. 7, process 700 may include receiving data indicating a vehicle (block 730). As further shown in FIG. 7, process 700 may include determining a compatibility score indicating a compatibility between the driver and the vehicle (block 740). The compatibility score may be based on a comparison of the performance data of the vehicle with the data corresponding to the driver archetype. As further shown in FIG. 7, process 700 may include transmitting data indicating the compatibility score (block 750).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for predicting driver-vehicle compatibility using machine learning, the system comprising:

one or more memories; and one or more processors, communicatively coupled to the one or more memories, configured to:

receive, from an on-board device of a vehicle or from a vehicle simulator, driving data for a plurality of drivers, wherein the driving data indicates, for at least a portion of the plurality of drivers, driving behavior and a plurality of importance values corresponding to a plurality of driving categories associated with the driving behavior, wherein, for at least a portion of the plurality of drivers, the driving behavior is measured during operation of the vehicle, and wherein, for at least a portion of the plurality of drivers, the driving behavior is measured during operation of the vehicle simulator, wherein the vehicle simulator is configured to measure driver input in response to simulated driving scenarios;

determine, using an unsupervised machine learning model and based on the driving behavior and the plurality of importance values, a plurality of driver clusters for categorizing the plurality of drivers;

receive vehicle data for a plurality of vehicles, wherein the vehicle data indicates, for each of the plurality of vehicles, a plurality of performance values corresponding to the plurality of driving categories;

generate a data structure that indicates a strength of relationship score between a vehicle, or a vehicle cluster that includes the vehicle, and each driver cluster of the plurality of driver clusters based on the driving behavior, the plurality of importance values, and the plurality of performance values;

receive, in real-time, driver preference data for a user, wherein the driver preference data includes data measured during vehicle operation and a plurality of user-input importance values that correspond to each driving category of the plurality of driving categories;

modify a user-input importance value, from the plurality of user-input importance values, by a set amount based on the data measured during vehicle operation, wherein the set amount corresponds to an importance tier that the user-input importance value is within;

determine a driver cluster, of the plurality of driver clusters, to which the user belongs based on the driver preference data and modified user-input importance value;

determine one or more compatible vehicles for the user based on the driver cluster and the data structure; and output vehicle information that indicates the one or more compatible vehicles.

2. The system of claim 1, wherein the one or more processors, to output the vehicle information, are configured to provide, to a user device, the vehicle information with each of the one or more compatible vehicles as a selectable option; and wherein the one or more processors are further configured to:

receive, from the user device, data indicating a selection of a compatible vehicle from the one or more compatible vehicles; and provide, to the user device, data indicating one or more third party entities within a threshold distance of a user location and having an inventory of vehicles that includes the compatible vehicle selected by the user.

3. The system of claim 2, wherein the one or more processors are further configured to:

provide, to a third party device of each of the one or more third party entities, at least one of the data indicating the selection of the compatible vehicle or contact information of the user.

4. The system of claim 1, wherein the on-board device measures the driving behavior by monitoring or measuring performance of the vehicle of a corresponding one of the plurality of drivers.

5. The system of claim 4, wherein the one or more processors are further configured to:

determine, for each driving category, a condition, of a plurality of conditions, that is satisfied by one or more measurements related to the driving category, wherein an importance value is associated with the condition; and assign, for each driving category, the importance value associated with the condition.

6. The system of claim 1, wherein the vehicle simulator includes a steering wheel, a gas pedal, or a brake pedal.

7. The system of claim 1, wherein one or more driver clusters, of the plurality of driver clusters, are generated based on at least one of:

demographic information common to the drivers in the one or more driver clusters;

a geographic location associated with the drivers common to the drivers in the one or more driver clusters; or each driver in the one or more driver clusters requiring adaptive equipment for driving.

8. The system of claim 1, wherein one or more driver clusters, of the plurality of driver clusters, are generated based on combinations of driver importance values of the drivers in the one or more driver clusters.

9. The system of claim 1, wherein the one or more processors are further configured to:

determine, using a second unsupervised machine learning model, a plurality of vehicle clusters for categorizing the plurality of vehicles, wherein each vehicle cluster is based on vehicle performance and the plurality of performance values, wherein the vehicle performance is measured during operation of each of the plurality of vehicles.

10. The system of claim 1, wherein each of the plurality of performance values indicates performance of a vehicle in association with a corresponding one of the plurality of driving categories.

11. A method of predicting driver-vehicle compatibility, comprising:

receiving, from an on-board device of a vehicle or from a vehicle simulator, driving data for a plurality of drivers, wherein the driving data indicates, for at least a portion of the plurality of drivers, driving behavior and a plurality of importance values corresponding to a plurality of driving categories associated with the driving behavior, wherein, for at least a portion of the plurality of drivers, the driving behavior is measured during operation of the vehicle, and wherein, for at least a portion of the plurality of drivers, the driving behavior is measured during operation of the vehicle simulator, wherein the vehicle simulator is configured to measure driver input in response to simulated driving scenarios;

determining, using an unsupervised machine learning model and based on the driving behavior and the plurality of importance values, a plurality of driver clusters for categorizing the plurality of drivers;

receiving, by a system and in real-time, driver preference data for a driver, wherein the driver preference data includes data measured during vehicle operation and a plurality of driver-input importance values that correspond to each driving category of the plurality of driving categories;

modifying a driver-input importance value, from the plurality of driver-input importance values, by a set amount based on the data measured during vehicle operation, wherein the set amount corresponds to an importance tier that the driver-input importance value is within;

associating, by the system and based on the plurality of driver clusters and the modified driver-input importance value, the driver with a driver archetype, wherein data corresponding to the driver archetype indicates a combination of ranges of values for the plurality of driving categories, and wherein an individual importance value for a driving category, of the plurality of driving categories, for the driver falls within a corresponding range of values for the driving category in connection with the driver archetype;

storing, by the system, the driver preference data and an indication of the driver archetype in a driver profile database, wherein the driver preference data and the indication of the driver archetype are associated with a driver identifier associated with the driver;

receiving, by the system, data indicating a vehicle, wherein performance data of the vehicle is stored in a vehicle profile database and indicates a plurality of performance values corresponding to the plurality of driving categories;

determining, by the system, a compatibility score indicating a compatibility between the driver and the vehicle, wherein the compatibility score is based on a comparison of the performance data of the vehicle with the data corresponding to the driver archetype; and transmitting, by the system, data indicating the compatibility score.

12. The method of claim 11, further comprising:

transmitting, to a user device, data indicating a plurality of queries relating to driver satisfaction in connection with the plurality of driving categories for the vehicle; and receiving, from the user device, data indicating a particular performance value for each of the plurality of driving categories in response to the plurality of queries.

13. The method of claim 12, further comprising:

receiving, from another user device, data indicating another performance value for each of the plurality of driving categories for the vehicle; and updating the particular performance value for each of the plurality of driving categories based on the data indicating the other performance value for each of the plurality of driving categories.

14. The method of claim 11, wherein the compatibility score is determined based on a machine learning model.

15. The method of claim 14, further comprising:

transmitting, to a user device or a third party device, data indicating one or more queries of a satisfaction of the vehicle in one or more driving categories of the plurality of driving categories;

receiving, from the user device or the third party device, data indicating a satisfaction score in response to each of the one or more queries; and retraining the machine learning model based on the data indicating the satisfaction score in response to one or more of the queries.

16. A non-transitory computer-readable medium storing a set of instructions, the set of instructions comprising:

one or more instructions that, when executed by one or more processors of a device, cause the device to:

receive, from an on-board device of a vehicle or from a vehicle simulator, driving data for a plurality of drivers, wherein the driving data indicates, for at least a portion of the plurality of drivers, driving behavior and a plurality of importance values corresponding to a plurality of driving categories associated with the driving behavior, wherein, for at least a portion of the plurality of drivers, the driving behavior is measured during operation of the vehicle, and wherein, for at least a portion of the plurality of drivers, the driving behavior is measured during operation of the vehicle simulator, wherein the vehicle simulator is configured to measure driver input in response to simulated driving scenarios;

determine, using an unsupervised machine learning model and based on the driving behavior and the plurality of importance values, a plurality of driver clusters for categorizing the plurality of drivers;

obtain data corresponding to a plurality of driver archetypes, wherein the plurality of driver archetypes are based on the plurality of driver clusters, and wherein the data corresponding to each of the plurality of driver archetypes indicates a combination of ranges of values for a plurality of driving categories;

receive vehicle data for a plurality of vehicles, wherein the vehicle data indicates, for each of the plurality of vehicles, a plurality of performance values corresponding to the plurality of driving categories;

generate a data structure that indicates a corresponding strength of relationship score between each vehicle, of the plurality of vehicles, and each driver archetype, of the plurality of driver archetypes, based on the plurality of performance values and the combination of ranges of values for the plurality of driving categories;

receive, in real-time, driver preference data for a user, wherein the driver preference data indicates a plurality of user-input importance values that correspond to the plurality of driving categories;

modify a user-input importance value, from the plurality of user-input importance values, by a set amount based on the data measured during vehicle operation, wherein the set amount corresponds to an importance tier that the user-input importance value is within;

assign a driver archetype to the user based on the driver preference data and the modified user-input importance value;

determine a suggested vehicle, of the plurality of vehicles, based on the data structure, wherein the suggested vehicle has a strength of relationship score that satisfies a threshold value in connection with the driver archetype; and transmit, to a user device, data indicating the suggested vehicle.

17. The non-transitory computer-readable medium of claim 16, wherein the one or more instructions, when executed by the one or more processors, further cause the device to:

transmit, to the user device or a third party device, data indicating one or more queries of a satisfaction of the user with the suggested vehicle; and receive, from the user device or the third party device, data indicating a satisfaction score in response to each of the one or more queries.

18. The non-transitory computer-readable medium of claim 17, wherein the one or more instructions, when executed by the one or more processors, further cause the device to:

adjust the performance value of one or more of the plurality of driving categories of the suggested vehicle based on the data indicating the satisfaction score in response to the one or more queries.

19. The non-transitory computer-readable medium of claim 16, wherein the one or more instructions, when executed by the one or more processors, further cause the device to:

store, in a driver profile database under a user account associated with a driver identifier for the user, the driver preference data of the user and data indicating the driver archetype associated with the user.

20. The non-transitory computer-readable medium of claim 16, wherein the one or more instructions, that cause the device to receive the vehicle data for the plurality of vehicles, cause the device to:

obtain the vehicle data from a vehicle profile database.

* * * * *